United States Patent
Mertens

(10) Patent No.: US 7,953,249 B2
(45) Date of Patent: May 31, 2011

(54) FRACTAL $S_{kr}$-METHOD FOR EVALUATING IMAGE QUALITY

(75) Inventor: Luc Mertens, Ranst (BE)

(73) Assignee: University of Antwerp (UIA), Antwerp (BE)

( * ) Notice: Subject to any disclaimer, the term of this patent is extended or adjusted under 35 U.S.C. 154(b) by 1013 days.

(21) Appl. No.: 11/543,623

(22) Filed: Oct. 4, 2006

(65) Prior Publication Data

US 2007/0184373 A1  Aug. 9, 2007

Related U.S. Application Data

(63) Continuation of application No. PCT/EP2005/003889, filed on Apr. 13, 2005.

(30) Foreign Application Priority Data

Apr. 13, 2004 (WO) ............... PCT/EP2004/003894

(51) Int. Cl.
G06K 9/00 (2006.01)
(52) U.S. Cl. ........ 382/112; 382/209; 382/206; 382/249; 382/274
(58) Field of Classification Search .................. 382/112, 382/159, 209, 249, 274
See application file for complete search history.

(56) References Cited

U.S. PATENT DOCUMENTS

| | | | | |
|---|---|---|---|---|
| 5,235,652 | A * | 8/1993 | Nally | 382/112 |
| 5,490,516 | A | 2/1996 | Hutson | |
| 5,600,574 | A * | 2/1997 | Reitan | 702/185 |
| 5,701,369 | A * | 12/1997 | Moon et al. | 382/249 |
| 5,838,833 | A * | 11/1998 | Ishikawa et al. | 382/249 |
| 5,912,988 | A * | 6/1999 | Moore | 382/209 |
| 6,024,504 | A | 2/2000 | Weichmann et al. | |
| 6,707,932 | B1 * | 3/2004 | Chakraborty | 382/113 |
| 6,785,405 | B2 * | 8/2004 | Tuttle et al. | 382/112 |
| 7,433,098 | B2 * | 10/2008 | Klein et al. | 358/505 |
| 7,684,625 | B2 * | 3/2010 | Hyoki | 382/217 |
| 2003/0044087 | A1 | 3/2003 | Kondo et al. | |
| 2003/0142985 | A1 | 7/2003 | Sampath et al. | |
| 2003/0235345 | A1 * | 12/2003 | Stalcup et al. | 382/305 |
| 2006/0015496 | A1 * | 1/2006 | Keating et al. | 707/6 |

FOREIGN PATENT DOCUMENTS

EP  1 341 384 A  9/2003

OTHER PUBLICATIONS

International Search Report for International Application No. PCT/EP2005/003889 filed Apr. 13, 2005.

* cited by examiner

*Primary Examiner* — Vikkram Bali
*Assistant Examiner* — Julian D Brooks
(74) *Attorney, Agent, or Firm* — Knobbe Martens Olson & Bear, LLP

(57) ABSTRACT

This invention provides an improved method for evaluating the quality of images using a test $S_{kr}$-matrix system. The index k refers to the fractal level in an $S_{kr}$-matrix, having matrices themselves as elements. The index r≦k refers to the Kronecker sub-level to which a typical internal sum structure is present. $S_{kr}$-matrices can be explained in terms of cognition numbers, basic components, eigenvalues and sine-like eigenvectors. $S_{kr}$-matrices also form vector spaces in which matrix distances can be properly calculated. The image $S_{kr}$-quality parameters are derived from an intermediate quasi-$S_{kr}$-matrix and its best-$S_{kr}$-approximation in relation to a theoretical reference $S_{kr}$-matrix. Useful applications are in the field of analogue and digital cameras, scanners, vision sensors, monitors, printers, spectrophotometers, infrared cameras, copying machines, TV-screens, GPS screens, X-rays, Gamma rays, Laser rays, or every other component in the image production and image handling field.

14 Claims, 3 Drawing Sheets

FRACTAL $S_{kr}$-METHOD FOR EVALUATING IMAGE QUALITY

REFERENCE TO RELATED APPLICATIONS

This application claims priority to and is a continuation of PCT International Application Number PCT/EP2005/003889, filed on Apr. 13, 2005, which claims priority to patent application PCT/EP2004/003894 filed on Apr. 13, 2004. The disclosures of the above-described applications are hereby incorporated by reference in their entirety.

BACKGROUND OF THE INVENTION

1. Field of the Invention

The present invention relates to the field of digital and analogue image processing. The present invention relates to an improved method for evaluating the quality of images. In particular, the present invention relates to a method for evaluating the quality of an image by providing a calibration method using a test matrix system. The test matrix system in particular comprises reference matrices having an internal $S_{kr}$-matrix sum structure. The parameter k describes a fractal level to which these matrices are build up by sub-matrices, while r describes the sub-level to which the special sum structure (S-structure) is present in the corresponding sub-matrix levels. The present invention also relates to the use of the specific test matrix system for evaluating the quality of an image and for various other applications related to Image Quality Control and Color Management Systems.

2. Description of the Related Technology

Recently, the use of image technology has drastically increased. There has been a break through in digital photography, the processes for color printing and color photography have been improved, high definition TVs have been developed and the use of digital cameras, videophones, GPS-screens, night watchers, heat watchers, line scanners, etc. ... has greatly increased. The increase in social interest for image information leads to a simultaneous race for qualitatively improving image equipment.

A (digital) image representation acquired by any kind of detector and/or image acquisition system, always comprises noise and systematic errors to some extent. Also, especially for color images, discrepancies may exist between images as represented on a digital display (e.g. monitor or screen) and the printed version of the images. To overcome such problem, the color components of the pixels in an image need to be adjusted, (including adjusting brightness, contrast, mid-level grey, hue, and saturation) in order to achieve optimum presentation results. For that color calibration is applied. Color calibration also includes a system of software and/or hardware that matches the colors between two or more digital devices. Color Management Systems commonly compare device color profiles and translate one color model into an intermediate and device-independent form that the next color device can use. The process of adjusting an image to compensate for apparatus deficiencies or output device characteristics is referred to as color correction.

Many methods are known in the art for correction of images in order to reduce noise and to improve image (color) quality (e.g. GretagMacbeth, IT8, ICC-profiles ... ). In practice, presently applied methods evaluate reference images on a statistical basis and more or less in a local way, i.e. local areas or zones of the reference images are used for image analysis and correction. The circumstances under which such reference image is created are therefore rather critical and severe. A problem associated with such methods is that if the obtained reference images lack preciseness and sharpness, the usage of these images in image correction methods may result in sub-optimal image corrections.

Further, the successful use of analogue or digital cameras and industrial image vision technology can only be expected if one can guarantee a repeatable calibration procedure. Lightning conditions during image generation of a start up phase and a user phase are not always similar: focusing and diaphragm installations can get disrupted, working distances or shutter times may change; device electronics need to be adjusted, etc. . . . The optical device needs then to be calibrated. Objective measurements should permit to correct generated and viewed pixel intensities such that an optimal situation is obtained "vis-à-vis" with a previously determined criterion.

For this purpose, e.g. an $IT_8$-calibration scheme (or others) is used in the art for calibrating color images. This calibration technique is based on control measurements of a previously determined color mosaic and/or grey value gradients. The measurements provide information, which can be fed back to algorithms for fine-tuning. During self-tuning, the light source and/or the electronic device parameters are automatically regulated such that the image or image reproduction obtains optimal quality. This self-tuning is generally based on a least quadratic method which optimizes a certain cost function. A drawback of such method is that calibration using the IT-8 color mosaic and/or grey profiles can only be performed in a one directional way. As a result thereof, the calibration method is not always as efficient, accurate and reliable.

In order to streamline the commercial activities and the progress in image processing in different image processing fields, there is a great need in the art for developing one single "Quality Norm" for image processing which could be used in all image processing fields. There also remains a great need in the art for providing improved calibration techniques to evaluate and correct images.

It is therefore a general need in the art to provide an improved method for evaluating images, and in particular for evaluating the quality of an image. It is in particular an need in the art to provide a method for correcting images for defects and for reducing image noise. It is also a need in the art to provide a method for image color correction.

SUMMARY OF CERTAIN INVENTIVE ASPECTS

In particular, the presented embodiments aim to provide an image quality evaluation method based on a test matrix system, named '$S_{kr}$-matrix System', which enables to evaluate and correct a generated image. Moreover, the presented embodiments also aim to provide a method for generating a test matrix system of reference matrices, which may be used in a method for evaluating image quality which is more accurate and more reliable than currently applied reference systems.

In a first aspect, the present invention relates to a method for evaluating image quality using a test matrix system which comprises test matrices having an internal $S_{kr}$ matrix structure, wherein k and r are different from zero. The method may be used to evaluate images or specific regions of interest thereof. According to the present invention also sequences of images may be evaluated: the sequences of images can be handled as a consecutive set of separate images. The present method is based on the evaluation and use of two-dimensional image coherence as an improved calibration step for color management and quality improvement.

In its broadest aspect, the method comprises the generation of images of an $S_{kr}$-object using an optical device. $S_{kr}$-objects may include but are not limited to 'High Quality Photos, CD-roms with $S_{k,r}$-movies, Thermal reference constructions, High Quality Absorption Material, etc. . . . The method of the invention is in particular based on the construction of a reference $S_{k,r}$-matrix system, comprising a plurality of reference $S_{k,r}$-matrices which correspond to different types of reference $S_{k,r}$-images. The present method is in particular characterized in that the used reference $S_{k,r}$-matrices have a specific structure: i.e. an internal $S_{k,r}$-matrix structure. This term refers to a matrix representing a reference $S_{k,r}$-image, said matrix having a k-fold tensor structure (i.e. a fractal matrix structure in which the matrix elements as such are themselves matrices and this to a k-fold level); of which only r≦k levels follow a specific internal sum structure which will be explained later. The analysed images are represented by means of an actual matrix, whereby each value of the matrix corresponds to a representative pixel value (e.g. local mean values, local median values) of the generated actual image. A geometrical correction for radial distortion may be important for automated pixel selections and can be based on the shape and grid pattern of the generated $S_{k,r}$-image.

It is also possible to select a specific region of interest (ROI) of an actual image, which will then be represented by a sub-matrix, whereby each value of the sub-matrix corresponds to a representative pixel value of the ROI of the actual image.

In some embodiments, the actual matrix or a sub-region thereof is then transformed in a more ore less (intermediate) application-independent quasi-$S_{k,r}$-matrix and a best-fit $S_{k,r}$-matrix is established starting from of this intermediate form. The calculation of the application-independent quasi-Skr-matrix is based on well known statistical methods to identify the mean specific laws of image production (e.g. the derivation of the non-linear gamma factor). Inverse calculations make it possible to transform the generated image in an application-independent form. A precise communication between the different components of an image production and reproduction chain needs such application independent color or grey scale information. After this step a two-dimensional balancing technique brings the independent matrix in an $S_{k,r}$-compliant form. This balancing step is based on finding the best $S_{k,r}$-matrix fit of the independent quasi-$S_{k,r}$-matrix or a sub-region thereof. From the characteristics of the identified best-fit $S_{k,r}$-matrix, the image quality parameters of the actual image are deduced and subsequently corrected in order to conform to standard quality norms. This quality evaluation is based on the matrix differences and 'the matrix distances' of matrices relative to each other and in relation to a theoretical reference matrix of a test $S_{k,r}$-matrix system. The image quality parameters can be fed back to the optical device, of which the operational parameters are corrected and adapted such that the device is calibrated for subsequent image generation. In practice this can be based on minimizing specific cost functions or searching for a maximum contrast between the image eigenvalues and/or its eigenvalue-noise. Such method is comparable with signal-to-noise-ratios in other disciplines.

The present method also permits to extend the classic white-balancing techniques to grey scale or color-balancing techniques. In addition to such white-balancing techniques, the present invention also permits to measure the behaviour of this white balance in relation to the grey scale and color contrast of adjacent pixel zones.

In another aspect, the invention provides for the use of $S_{k,r}$-matrices as reference matrices for evaluating the quality for calibrating an optical device.

In a first embodiment, the invention relates to a method for evaluating the quality of an image comprising the steps of
 a) generating a suitable image of an object using an optical device,
 b) defining an actual matrix for said generated image, said actual matrix comprises a value for each pixel of the generated image,
 c) providing a test matrix system comprising reference matrices which define reference images and wherein each reference matrix comprises a value for each pixel of the reference image,
 d) identifying a best-fit matrix, which shows the best-fit with the actual matrix,
 e) defining image quality parameters of the generated image by deducing said image quality parameters from the best-fit matrix identified in step d),
 f) providing a report of the image quality parameters of the generated image,
characterized in that the test matrix system comprises test matrices having an internal $S_{k,r}$ matrix structure, wherein k and r are different from zero.

Preferably, the invention relates to a $S_{k,r}$-method for evaluating the $S_{k,r}$-quality of an $S_{k,r}$-image comprising the steps of
 a) generating an (application and evaluation dependent) image of an $S_{k,r}$-object using an optical device,
 b) defining an actual and representative matrix for said generated $S_{k,r}$-image, said actual matrix comprises a value for each pixel of the generated $S_{k,r}$-image or a pixel value for representative selections from it,
 c) calculating the intermediate quasi-$S_{k,r}$-matrix from said actual matrix,
 d) providing a test $S_{k,r}$-matrix system comprising reference $S_{k,r}$-matrices which define reference $S_{k,r}$-images and wherein each reference $S_{k,r}$-matrix comprises a corresponding value for each pixel of the intermediate quasi-$S_{k,r}$-matrix,
 e) identifying a best-fit $S_{k,r}$-matrix (based e.g. on cognition numbers, basic components or value/noise-ratios in the eigenvalue decomposition) which shows the best-fit with the intermediate quasi-$S_{k,r}$-matrix,
 f) deriving image $S_{k,r}$-quality parameters of the generated $S_{k,r}$-image by deducing said image $S_{k,r}$-quality parameters from the best-fit $S_{k,r}$-matrix identified in step e), in relation to the actual matrix and the reference $S_{k,r}$-matrix, and
 g) providing a report of the image $S_{k,r}$-quality parameters of the generated image which describes the actions to be taken to obtain optimized image results.

In another embodiment the present method comprises selecting a region of interest (ROI) on the generated image for evaluating the quality of said generated image. In a preferred embodiment, the invention relates to $S_{k,r}$-method as defined above comprising selecting a region of interest (ROI) on the generated $S_{k,r}$-image for evaluating the $S_{k,r}$-quality of said generated $S_{k,r}$-image. The term ROI as used herein preferably refers to triangular, rectangular, banded diagonal, corner regions or random parts of an $S_{k,r}$-image or its Kronecker sub-regions. The representative pixels are chosen from a grid pattern that covers such a ROI.

In yet another embodiment the present method comprises the steps of:
 a) generating a suitable image of an object using an optical device,
 b) defining an actual matrix for said generated image, said actual matrix comprises a value for each pixel of the generated image, c) selecting a region of interest (ROI) on the generated image, said selected ROI being defined by an actual sub-matrix,
d) providing a test matrix system comprising reference matrices which define reference images and wherein each reference matrix comprises a value for each pixel of the reference image,
e) identifying a best-fit matrix, which shows the best-fit with the actual sub-matrix,
f) defining image quality parameters of the ROI of the generated image by deducing said image quality parameters from the best-fit matrix identified in step e),
g) defining image quality parameters of the generated image starting from the image quality parameters defined for the ROI of the generated image in step f)
h) providing a report of the image quality parameters of the generated image, characterized in that the test matrix system comprises test matrices having an internal $S_{k,r}$ matrix structure, wherein k and r are different from zero.

Preferably, the invention relates to $S_{kr}$-method as defined above comprising the steps of:
a) generating an (application and evaluation dependent) image of an $S_{kr}$-object using an optical device,
b) selecting a region of interest (ROI) on the generated $S_{kr}$-image, said ROI is formed as a fractal selection from the Kronecker $S_{kr}$-sub-matrices,
c) defining actual and representative sub-matrices for said generated $S_{kr}$-image, said actual matrices comprise values for each pixel of the generated $S_{kr}$-image or a representative sub-selection from it,
d) calculating the intermediate quasi-$S_{kr}$-sub-matrices from said actual sub-matrices, said intermediate quasi-$S_{kr}$-sub-matrices represent a first and local approximation of the perception or image production laws,
e) providing a test $S_{kr}$-matrix system comprising reference $S_{kr}$-matrices which define reference $S_{kr}$-images and wherein each reference $S_{kr}$-sub-matrix comprises a corresponding value for each pixel of an actual $S_{kr}$-sub-matrix,
f) identifying best-fit $S_{kr}$-sub-matrices (based e.g. on cognition numbers, basic components or value/noise-ratios in the eigenvalue decomposition) which shows the best-fit for each intermediate quasi-$S_{kr}$-sub-matrix,
g) deriving image $S_{kr}$-quality parameters of the generated $S_{kr}$-image by deducing said image $S_{kr}$-quality parameters from the best-fit $S_{kr}$-sub-matrices identified in step f),
h) defining image $S_{kr}$-quality parameters of the generated image starting from the image $S_{kr}$-quality parameters defined for the ROI of the generated image in step f), and
i) providing a report of the image $S_{kr}$-quality parameters of the generated image which describes the actions to be taken to obtain optimized image results.

In another embodiment, the present method is characterized in that the method further comprises the steps of: correcting the image quality parameters of the generated image such that the generated image closely fits standard image quality parameters, and restoring and visually displaying the generated image after image correction. Preferably, the invention further relates to an $S_{kr}$-method as defined above, characterized in that the $S_{kr}$-method further comprises the steps of correcting the image $S_{kr}$-quality parameters of the generated $S_{kr}$-image based on manual or automated interventions in the image production chain in such a way that the generated $S_{kr}$-image closely fits standard image quality parameters, and restoring and visually displaying the generated $S_{kr}$-image after quality improvements.

In yet another embodiment, the present method is further characterized in that the image quality parameters are corrected by correcting the operational parameters of the optical device by means of a software program based on self-tuning algorithms. Preferably, the $S_{kr}$-image quality parameters are corrected by correcting the operational parameters of the optical device by means of a $S_{kr}$-software program based on closed loop and self-tuning algorithms.

In another embodiment, the method as defined herein is characterized in that said image comprises a sequence of images. Preferably, the invention relates to an $S_{kr}$-method as defined above, characterized in that said $S_{kr}$-image comprises a sequence of $S_{kr}$-images.

In yet another embodiment, the method as defined herein is characterized in that the image quality parameters of the generated image or a ROI thereof are determined on a pixel-by-pixel basis by comparing the values of the actual matrix or of the actual sub-matrix respectively representing the pixels of the generated image or a ROI thereof with the values of a test matrix, representing the pixels of a test image. Preferably, the present invention also provides for an $S_{kr}$-method as defined above, characterized in that the $S_{kr}$-image quality parameters of the generated $S_{kr}$-image or a ROI thereof are determined on a pixel-by-pixel basis by comparing the values of the intermediate quasi-$S_{kr}$-matrix or the intermediate sub-matrix, respectively representing the pixels of the generated $S_{kr}$-image or a ROI thereof, with the values of a test $S_{kr}$-matrix representing the corresponding pixels of a test $S_{kr}$-image.

Some embodiments further provide a method characterized in that the image quality parameters of the generated image or a ROI thereof are determined on a zone-by-zone basis by comparing a zone on the actual matrix or on the actual sub-matrix respectively representing the generated image or a ROI thereof with a zone on the test matrix, representing a test image. Preferably, the present invention also provides for an $S_{kr}$-method as defined above, characterized in that the image $S_{kr}$-quality parameters of the generated image or a ROI thereof are determined on a zone-by-zone basis by comparing a zone on the actual $S_{kr}$-image or on the actual sub-matrix, respectively representing the generated $S_{kr}$-image or a ROI thereof, with the corresponding zone on the test $S_{kr}$-matrix representing a test $S_{kr}$-image.

In a further embodiment the invention further relates to a method as defined herein, characterized in that the image quality parameters of the generated image or a ROI thereof are determined on an image-by-image basis by comparing the actual image or a ROI thereof with a reference image. Preferably, the invention further provides in another embodiment an $S_{kr}$-method as defined herein, characterized in that the image $S_{kr}$-quality parameters of the generated $S_{kr}$-image or a ROI thereof are determined on an image-by-image basis by comparing the actual $S_{kr}$-image or a ROI thereof with the corresponding reference $S_{kr}$-image.

In yet another embodiment the present method as defined herein is characterized in that said test matrix system comprises test matrices having only one eigenvalue which differs from zero. Preferably, the present $S_{kr}$-method according to the invention is further characterized in that said test $S_{kr}$-matrix system comprises test $S_{kr}$-matrices having only one non-zero eigenvalue for the overall $S_{kr}$-test matrix and/or one non-zero eigenvalue for its Kronecker sub-matrices.

In another embodiment, the method as defined herein is characterized in that the test matrix system comprises matrices which are the Kronecker product of two or more test matrices having an internal $S_{k,r}$ sum structure. In some embodiments, the present $S_{kr}$-method according to the invention is also characterized in that the test $S_{kr}$-matrix system comprises $S_{kr}$-matrices which are the Kronecker product of two or more $S_{kr}$-test matrices.

In another aspect, the invention also relates to the use of a test matrix system comprising test matrices having an internal $S_{k,r}$ matrix structure, wherein k and r are different from zero for evaluating the quality of an image. In some embodiments, the invention also provides for the use of a test $S_{kr}$-matrix system comprising test $S_{kr}$-matrices having an internal $S_{k,r}$ sum matrix structure; and wherein k and r are different from zero, for evaluating the quality of image capturing, image production, image restoration and/or image reproduction.

Some embodiments also relate to the use of a test matrix system as defined herein, characterized in that said test matrix system comprises test matrices having only one eigenvalue which differs from zero. Preferably, the embodiments relate to the use of a test $S_{kr}$-matrix system as defined herein, characterized in that said test $S_{kr}$-matrix system comprises test $S_{kr}$-matrices having only one non-zero eigenvalue.

In another embodiment, a test matrix system as defined herein, is characterized in that the test matrix system comprises matrices which are the Kronecker product of two or more test matrices having an internal $S_{k,r}$ sum structure. In some embodiments, a test $S_{kr}$-matrix system as defined herein, is characterized in that the test $S_{kr}$-matrix system comprises $S_{kr}$-matrices which are the Kronecker product of two or more test $S_{kr}$-matrices having an internal $S_{k,r}$ sum structure.

Some embodiments also relate to the use of a test matrix system as defined herein for evaluating the quality of an image on a two dimensional basis. Preferably, the invention provides for the use of a test $S_{kr}$-matrix system as defined herein for evaluating the $S_{kr}$-quality of an $S_{kr}$-image on a two dimensional coherence basis.

Furthermore, the embodiments may further provide for the use of a test matrix system as defined herein for evaluating the quality of a generated image on a pixel-by-pixel basis, on a zone-by-zone basis or on an average image basis. Some embodiments relate to the use of the test $S_{kr}$-matrix system as defined herein, for evaluating the $S_{kr}$-quality of a generated $S_{kr}$-image on a fractal basis: i.e. a pixel-by-pixel basis, a zone-by-zone and an average image basis.

Another embodiment further provides for the use of a test matrix system as defined herein for evaluating the quality of a sequence of images. Some embodiments relate to the use of a test $S_{kr}$-matrix system as defined herein for evaluating the quality of a sequence of $S_{kr}$-images.

In another embodiment, a test matrix system as defined herein is used for evaluating the quality of an optical device. Some embodiments relate to the use of a test $S_{kr}$-matrix system as defined herein for evaluating the $S_{kr}$-quality of optical devices.

In yet another embodiment, a test matrix system as defined herein is used for calibrating an optical device. Some embodiments relate to the use of the $S_{kr}$-test matrix system as defined herein for $S_{kr}$-based calibration of optical devices.

Still further understanding will become apparent from the description and appending drawings, provided hereafter.

DETAILED DESCRIPTION OF CERTAIN INVENTIVE EMBODIMENTS

Definitions

Figure 1:
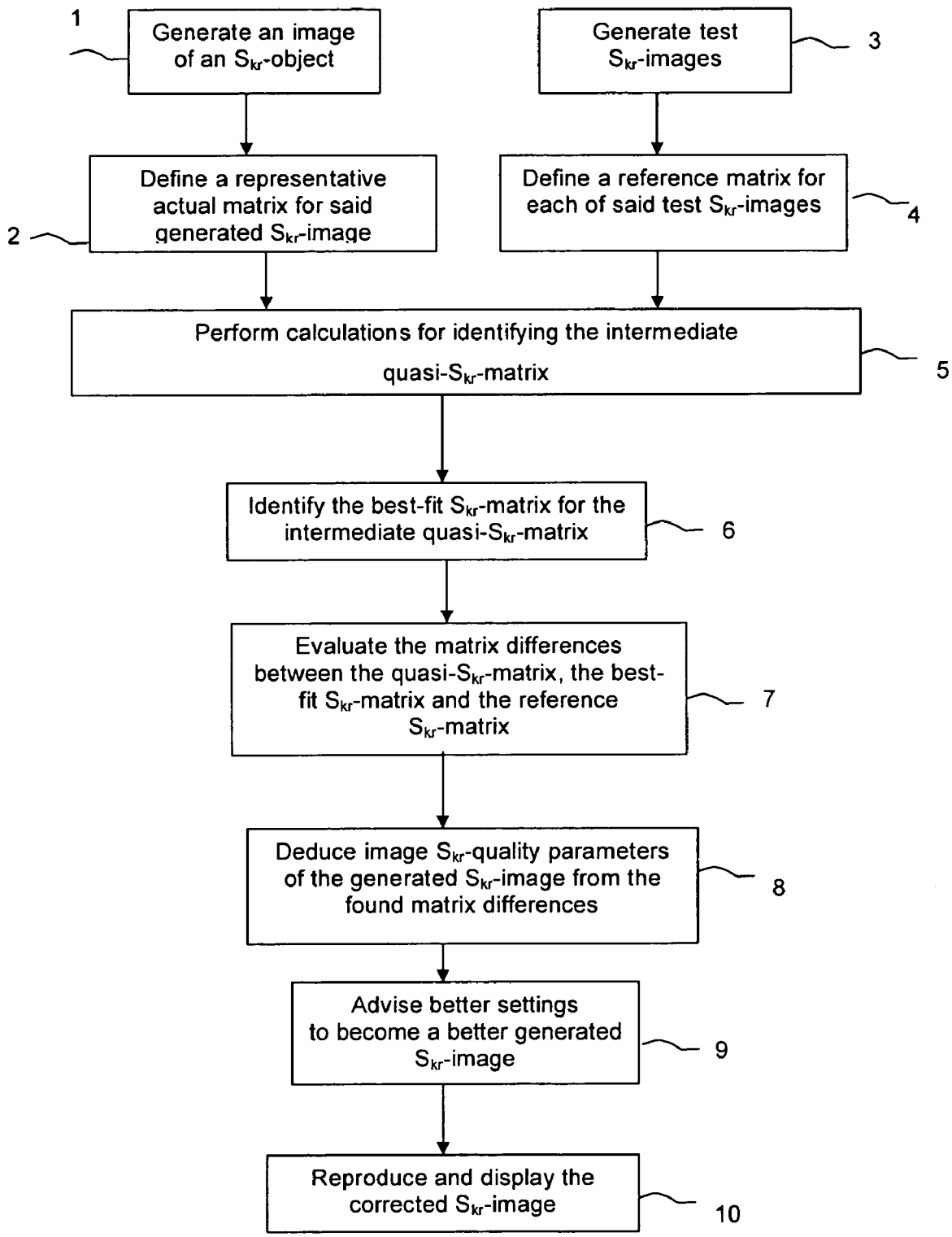
FIG. 1 illustrates a flow chart of an embodiment of an evaluation and calibration method. It is an open loop strategy for the overall image quality calculation based on $S_{kr}$-matrix properties.

The term "$S_1$-matrix" refers to a matrix having a typical internal sum structure together with double symmetric properties. This means every $S_1$-matrix element can be calculated from the elements in the first row (or column) of the matrix. For this reason the elements in this row are named: 'the cognition numbers'. Each cognition number a, b, c . . . is a common real or complex number. Here the matrix elements of $S_1$ represent grey scale or color coordinates of a reference $S_{kr}$-image. As an example we show a random $S_1$-matrix of order seven:

$$S_1 := \begin{vmatrix} a & b & c & d & e & f & g \\ b & a+c & b+d & c+e & d+f & e+g & f \\ c & b+d & a+c+e & b+d+f & c+e+g & d+f & e \\ d & c+e & b+d+f & a+c+e+g & b+d+f & c+e & d \\ e & d+f & c+e+g & b+d+f & a+c+e & b+d & c \\ f & e+g & d+f & c+e & b+d & a+c & b \\ g & f & e & d & c & b & a \end{vmatrix}$$

The term '$P_1$-matrix' refers to a matrix representing a reference image having a simple internal product structure. Every matrix element is build up as a product of elements in the first row of the matrix. The element wise logarithm of such matrix will bring the structure back to an $S_1$-matrix since the logarithm of a product gives rise to a sum. $P_1$-matrices may be used in feed forward strategies in which 'logarithmic perceptions laws' transform $P_1$-images into $S_1$-types. A comparison of a $P_1$-matrix with the corresponding $S_1$-matrix as shown above can easy be made.

$$P_1 := \begin{vmatrix} a & b & c & d & e & f & g \\ b & ac & bd & ce & df & eg & f \\ c & bd & ace & bdf & ceg & df & e \\ d & ce & bdf & aceg & bdf & ce & d \\ e & df & ceg & bdf & ace & bd & c \\ f & eg & df & ce & bd & ac & b \\ g & f & e & d & c & b & a \end{vmatrix}$$

The term "$S_2$-matrix" refers to a matrix representing a reference $S_{kr}$-image having a double internal sum structure. $S_2$-matrices are like $S_1$-matrices, but the cognition numbers are square sub-matrices having themselves an internal $S_1$-structure. For this reason $S_2$-matrices can be constructed with so called 'cognition matrices of type $S_1$'. A first sum structure is found in every Kronecker sub-matrix as shown before for $S_1$-matrices, while the second sum structure is found at the level of the sub-matrices themselves. As an example we show an $S_2$-matrix with random chosen cognition matrices A, B, C . . . :

$$S_2 := \begin{vmatrix} A & B & C & D & E & F & G \\ B & A+C & B+D & C+E & D+F & E+G & F \\ C & B+D & A+C+E & B+D+F & C+E+G & D+F & E \\ D & C+E & B+D+F & A+C+E+G & B+D+F & C+E & D \\ E & D+F & C+E+G & B+D+F & A+C+E & B+D & C \\ F & E+G & D+F & C+E & B+D & A+C & B \\ G & F & E & D & C & B & A \end{vmatrix}$$

Examples of $S_2$-matrices may include but are not limited to the Kronecker product of two $S_1$-matrices. For the Kronecker product it is important to remember from mathematics that the eigenvalues are obtained as product combinations of the two separate lists of eigenvalues of the starting matrices, while the overall eigenvector matrix is formed as a Kronecker product of the separate eigenvector matrices. Important variants of such $S_2$-matrices comprise matrices having only one non-zero eigenvalue in the Kronecker factors as well as in the sub-matrices found in their Kronecker product.

In contrast an $S_{2,1}$-matrix is build up with $S_1$-sub-matrices but these matrices have no further correlation relative to each other. The sum structure is only present in Kronecker sub-level 1 and not on the higher level. In an $S_{2,0}$-matrix no sum structure will be found at all. The structure of their eigenvectors is totally independent with respect to the eigenvectors of $S_1$-matrices.

The term "$S_{k,r}$-matrix" (herein also written as "$S_{k,r}$-matrix") refers to a matrix which is formed as a fractal composition of sub-matrices. 'Fractal' means here that the matrix elements are matrices themselves at the different levels p=1, 2, 3 . . . k . The sub-matrices at the levels p≦r follow the typical sum-structure, the higher levels don't. Therefore each random matrix can be defined as an $S_{k,0}$ matrix and a full 'sum-organized matrix' can be defined as an $S_{k,k}$ matrix, abbreviated as "$S_k$-matrix". The $S_{k,r}$-matrices form special subsets of matrices which have the characteristics of an algebraic vector space. This means, every order with respect to r and with respect to the matrix dimensions spans a unique space. $S_{k,r}$-matrices might be formed, but are not limited to a merged Kronecker product of r separated $S_1$-matrices with (k-r) non-$S_1$-matrix types.

$P_{k,r}$-matrices follow the same guidelines as $S_{k,r}$-matrices but with respect to the product structure in the levels p≦r. They don't form vector spaces but can be used in logarithmic feed forward strategies as mentioned before.

The "Kronecker sub-matrices" of a matrix $S_{k,r}$ are defined as square matrices of level p=1, 2, 3 . . . k, Sum-organized sub-matrices exist as long as p≦r. The location of one particular Kronecker sub-matrix at level k can be expressed by the block row and block column coordinates $i_k$ an $j_k$. In such a sub-matrix the position of the next group of Kronecker sub-matrices have block row and block column coordinates $i_{k-1}$ and $j_{k-1}$, etc. . . . On this basis every individual matrix element (or pixel) of an $S_{k,r}$-matrix (or $S_{k,r}$-image) gets a k-fold set of fractal coordinates $(i_k;j_k; i_{k-1},j_{k-1}; \ldots; i_2,j_2; i_1,j_1)$.

The term "calibration" as used herein refers to the checking of measuring instruments against a standard set of readings and to the process of adjusting an optical device such as a camera, scanner, sensor, monitor, printer or similar devices to a repeatable standard. For instance, a monitor is adjusted to a specific contrast (Gamma), brightness and white point color balance.

The term "optical device" refers to a device capable of recording or displaying an image of an object. Examples of optical devices include but are not limited to sensors, cameras, scanners, spectrophotometers, infrared cameras, copying machines, printers, TV-screens, GPS screens, monitors, etc. . . . .

The term "image" as used herein is meant to refer to analogue as well as to digital images, and to grey as well as to color images. The term images may also refer to a sequence of images.

The term "pixel" refers to a small continuous tone. A digital image is made up of small continuous tone spots called pixels. In an RGB image (with a bit depth of 24) each pixel can be any one of 16.7 million colors/tones. Each pixel is made up of three color channels (Red, Green, & Blue) and each channel can be any one of 256 levels of tone (256×256×256=16,777,216).

The term "grey scale", or "greyscale" or "grey" as used herein refers to an image containing shades of grey as well as black and white.

The term "color image" refers to a one or two-dimensional collection of colored spots. The term color herein refers to a set of coordinates (e.g: RGB, YMCK, HSV, CIExy . . . ) which are a measure for 'the color sensation' on human visual perception or on machine perception. Color production and reproduction can only work successful when the tri stimuli coordinates are well understood, measured and controlled on the highest possible level.

The term "image $S_{k,r}$-quality parameters" refers to different parameters defining image quality, including but not limited to the gamma factor, sharpness, resolution, brightness, contrast, intensity, gamut, symmetry, color coherence, radial distortion and other quality parameters currently known in the art of image processing. In the present method other relevant parameters arise: e.g. eigenvalue/noise-ratios, sum of square errors with respect to typical parameters of $S_{k,r}$-matrices.

The term "gamma factor" as used herein refers to the non linear mathematical function (power function with exponent gamma) which expresses the change in output in relation to the change of input (e.g. the electron beam behavior in CRT screens, chemical light dose effects, CCD-camera behavior, light absorption and/or reflection laws etc. . . . ). Cameras, monitors, photographic material and the like react to input changes in a non linear way. In most cases the non-linear relation can be represented by a mathematical exponential or power function, of which the exponent is called the gamma factor.

The term "$S_{E1}(m)$ matrix" as used herein refers to an $S_1$-matrix having one non-zero eigenvalue. This matrix comprises sine-like cognition numbers. Especially for images of high resolution, e.g. 12-bit, or for analogous (continued) image variants this type of matrix provides important benefices. For practical reasons, the matrix $S_{E1}(m)$ can be normalized over the interval [0,1] or over the interval [0,255]. The maximum value of this interval will be assigned as an upper left index and note the matrices respectively as $^1S_{E1}(m)$ or $^{255}S_{E1}(m)$. Associated with a specific color tone the matrix $S_{E1}$ can be interpreted as an $S_{E1}$-pigment matrix. Such $S_{E1}$-pigments may be mixed together to make other specific color tones.

The term "Helmholtz alike $S_{k,r}$-matrices" are $S_{k,r}$-matrices which are related to the finite difference approximations of differential operators (Laplace, Poisson, Helmholtz, Airy, Wave Equation, . . . ). In this document they are useful for the creation of $P_{k,r}$-matrixes in such a way that their logarithmic perception will result in an $S_{k,r}$-matrix form. In this case the gamma factor will logarithmic be present as a scale factor.

An $S_{kr}$ matrix can be split in two distinct and independent sub-structures named $S_{even}$ and $S_{odd}$. The term "$S_{even}$" refers to matrix elements or Kronecker sub-matrices with an even order: this means i+j=2*n, while the term "$S_{odd}$" refers to matrix elements or Kronecker sub-matrices of an odd order (i+j=2*n+1). Both parts are structurally independent from one another with regard to the sum structure, the cognition numbers, basic components and a lot of numerical calculations. The $S_{even}$ or $S_{odd}$ matrices themselves can be very useful for evaluating 'cross talk' between neighboring pixels in a camera or on a monitor.

Methods

Certain embodiments relate to an image evaluation and image correction method which is based on reference $S_{kr}$-images. The reference $S_{kr}$-images used in the method can be, but need not to be, obtained under strict and severe well-controlled circumstances. This means, the method is adapted as to use highly qualitative reference $S_{kr}$-images as well as reference $S_{kr}$-images of lower preciseness and quality for correcting actual $S_{kr}$-images. The method permits to obtain a very precise calibration of generated $S_{kr}$-images using these $S_{kr}$-reference images. Furthermore, the method is also compatible with the latest developments in 'Embedded Technology' because a lot of numerical activities turn out to be relative easy compared with the information they give.

Figure 2:
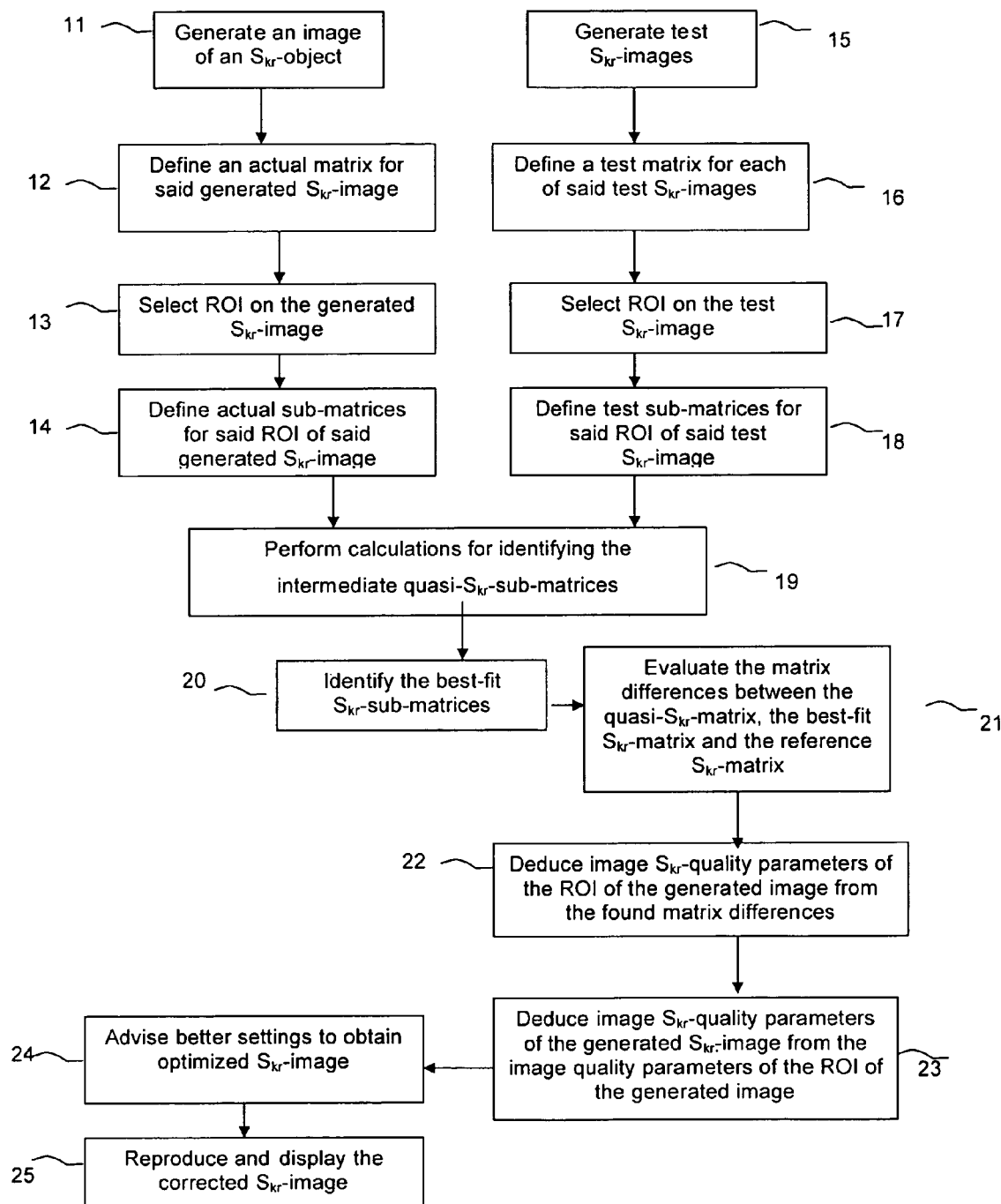
FIG. 2 illustrates a flow chart of another embodiment of the evaluation and calibration method. It is an open loop strategy for the fractal image quality calculation based on $S_{kr}$-sub-matrix properties.
Figure 3:
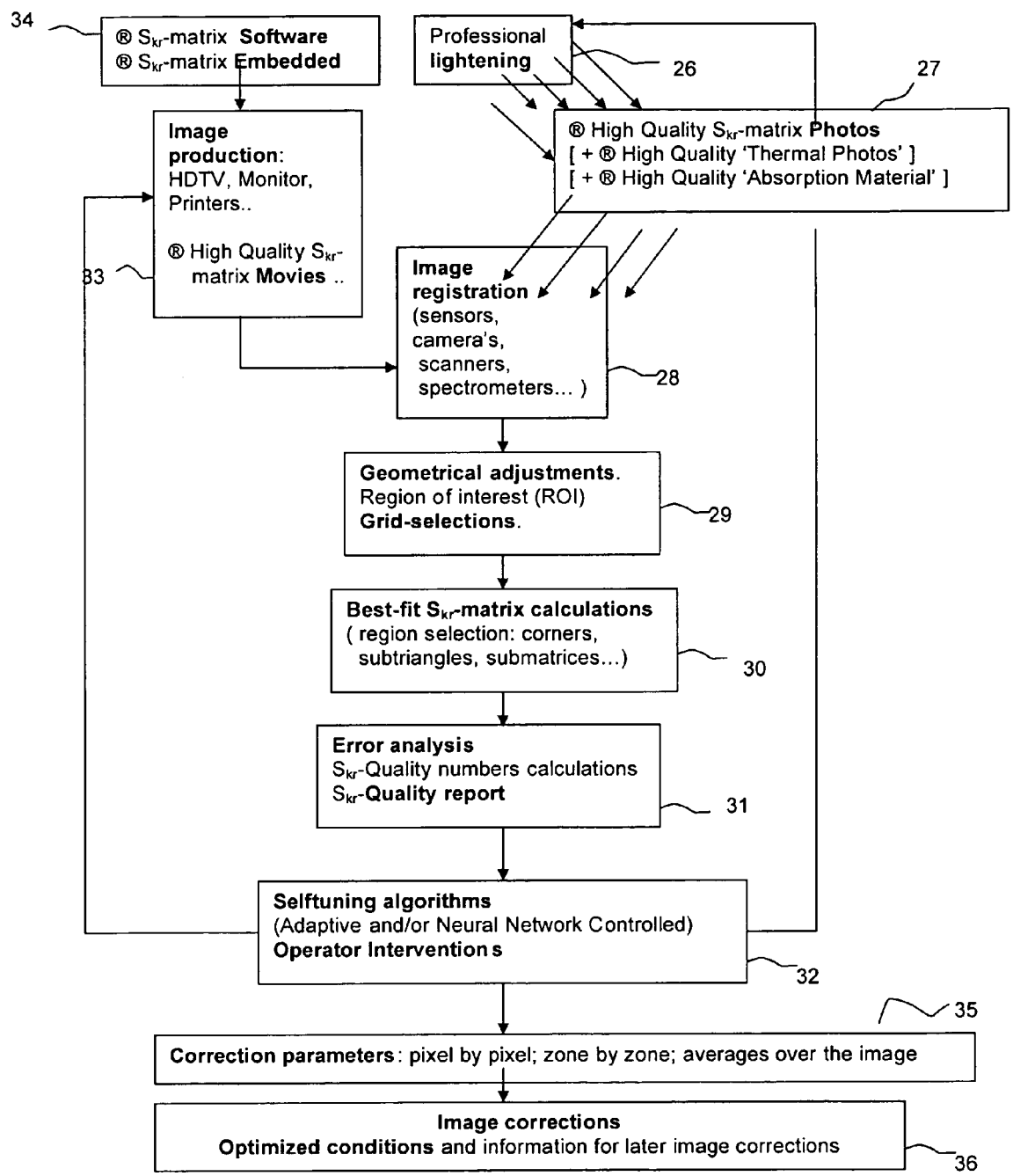
FIG. 3 illustrates a flow chart of yet another embodiment of the evaluation and calibration method. The method is a closed loop strategy for the overall or fractal color or grey scale calibration, based on $S_{kr}$-matrix properties.

In a first embodiment, in accordance with FIGS. 1 to 3, a method for evaluating image quality comprises the steps of:
 a) generating an application and evaluation dependent image of an $S_{kr}$-object using an optical device,
 b) defining a representative actual matrix for said generated $S_{kr}$-image, said actual matrix comprises a value for each pixel of the generated image or a representative selection from it,
 c) transforming the actual matrix in an intermediate quasi-$S_{kr}$-matrix form, based on classic least mean square techniques,
 d) providing a test $S_{kr}$-matrix system comprising reference $S_{kr}$-matrices which define reference $S_{kr}$-images and wherein each reference $S_{kr}$-matrix comprises a value for each pixel of the reference $S_{kr}$-image,
 e) identifying a best-fit $S_{kr}$-matrix, (based e.g. on cognition numbers, basic components or signal/noise-ratios in the eigenvalue decomposition) which shows the best $S_{kr}$-matrix fit with the intermediate quasi-$S_{kr}$-matrix,
 f) deriving image quality parameters of the generated $S_{kr}$-image by deducing image $S_{kr}$-quality parameters from 'the distance' between the intermediate quasi-$S_{kr}$-image, its best-fit $S_{kr}$-matrix and the $S_{kr}$-matrix which is used as the theoretical $S_{kr}$-reference.
 g) providing a report of the image $S_{kr}$-quality parameters of the generated $S_{kr}$-image, said report describing actions to be taken to obtain better results in the next step of the calibration procedure.

The term "test" matrix and "reference matrix" are used herein as synonyms.

The starting point of the present method is the construction of a mathematical reference $S_{kr}$-image mosaic, comparable e.g. with the $IT_8$-test, GretagMacbeth and the common ICC profiles but with color settings, which are verifiable by a substantial greater number of degrees of freedom. On this base it becomes possible to investigate on several aspects of an image during the calibration, such as: the gamma-factor during the recording, production or reproduction of the image, the conservation of the symmetry or anti-symmetry in the image, the influence of under- or over-illumination during image capturing on the image behavior, the global and local image color or grey scale coherence, the horizontal/vertical and diagonal image coherence, the geometric deformation, local edge contrast profiles and a lot of other image aspects. Because of its universality the $S_{kr}$-image mosaic can be applied for rough calibrations, controlling if the basic colors or grey levels show trough sufficiently, as well as for the extremely detailed calibrations at the level of the 'color or grey-continuum'. Between both extremes, the method gives the possibility to define reference $S_{kr}$-images fitting close to the resolution of every individual visual sensor, even at sub-pixel level. All this is in relation to a predefined image working distance and its "field of view".

As used herein the term "application and evaluation dependent" indicates that for each particular application, there is a free choice of a $S_{kr}$-reference matrix. Dependent on applications such as for instance but not limited to the available calculation time in real-time applications; or the desired image dynamics for screens; or pixel contrast analysis for vision-sensors, etc. . . . a certain $S_{kr}$-matrix variant may be more appropriate. This term thus indicates that a suitable $S_{kr}$-reference matrix is selected in function of the application one desires to perform. It should be understood that the present invention is not intended to be limited to the choice of a single reference $S_{kr}$-matrix. However, a preferred reference $S_{kr}$-matrix type is a $S_{kr}$-matrix having only one eigenvalue different from zero.

In step b) of the present method a representative actual matrix is defined. The complete image may consist of a great number of pixels and may resemble a "colored chessboard pattern". From each section of this chessboard pattern one or more pixels are selected which are representative for that section in further calculations.

As a result of a global logarithmic regression analysis, provisional intermediate forms (i.e. intermediate, quasi $S_{kr}$-matrix forms) will be formed for each image. These intermediate matrices provide a better approximation of the $S_{kr}$-matrix structure than actual $S_{kr}$-matrices. These intermediate matrices are therefore also denoted as having a quasi-$S_{kr}$-structure, i.e. closely resembling or approximating a $S_{kr}$-structure. Dependent of the circumstances of image formation or image perception, the presently defined $S_{kr}$-matrix structure will be disturbed at a certain level, but will in its global appearance be very similar to and strongly approximate a $S_{kr}$-structure as defined herein.

In $S_{kr}$-vector spaces eigenvalues can be seen as the components of a multi-dimensional vector. The tem "distance" as given above refers to the length of the difference vector, which is an objective indication of the distance between two similar $S_{kr}$-matrices. Reference is also made to a L2-norm. However, other matrix norms are also generally accepted to objectively measure the distance between matrices.

The $S_{kr}$-image quality parameters of the actual image are deduced from the characteristics of the more or less apparatus independent intermediate quasi-$S_{kr}$-matrix and its best-fit $S_{kr}$-matrix, all in relation to the reference $S_{kr}$-matrix. According to certain embodiments, an image quality report is established, reporting the $S_{kr}$-image quality and thus indirectly reporting the image processing quality, applied to generate the images. The $S_{kr}$-image quality report also provides information on the image processing quality of the optical device and its operational accuracy. Depending on the quality of the $S_{kr}$-images, the optical device may be classified into a certain $S_{kr}$-quality class, e.g. top, professional, good, normal and weak quality, depending on standard image processing norms, known in the art.

In a further embodiment, a method for calibrating an optical device and adjusting its operational parameters, such that images taken by the optical device are conform to standard prescribed quality norms is performed. Therefore, the present method further comprises the steps of:
- correcting the image quality parameters of the generated image such that the generated image (more) closely fits standard image quality parameters, and,
- restoring and visually displaying the generated image after image correction.

According to a preferred embodiment, the present method is characterized in that the image $S_{kr}$-quality parameters are corrected by correcting the operational parameters of the optical device with guided operator activities or based on a software program with self-tuning capabilities.

The present method can be used to evaluate $S_{kr}$-images or specific regions thereof. More specifically, certain embodiments provide a method for evaluating image quality, whereby only a specific region of interest of the image, and not the complete image, is used to evaluate image quality. In a preferred embodiment, the present method comprises the additional step of selecting a region of interest (ROI) on the generated image for evaluating the $S_{kr}$-quality of said generated image. Preferably, this extended method comprises the steps of
a) generating an application and evaluation dependent image of an $S_{kr}$-object using an optical device,
b) defining an actual and representative matrix for said generated $S_{kr}$-image, said actual matrix comprises a value for each pixel of the generated image or a representative selection from it,
c) selecting a region of interest (ROI) on the generated image, said selected ROI being defined by an actual sub-matrix,
d) transforming the actual sub-matrices in intermediate quasi-$S_{kr}$-sub-matrices based on classic or $S_{kr}$-guided least mean square techniques,
e) providing a test $S_{kr}$-matrix system comprising reference $S_{kr}$-sub-matrices which define reference $S_{kr}$-sub-images and wherein each reference sub-matrix comprises a value for each pixel of this reference $S_{kr}$-sub-image,
f) identifying best-fit $S_{kr}$-sub-matrices, (based e.g. on cognition numbers, basic components or value/noise-ratios in the eigenvalue decomposition) which shows the best $S_{kr}$-matrix fit with the intermediate quasi-$S_{kr}$-sub-matrices,
g) deriving image quality parameters of the ROI of the generated $S_{kr}$-image by deducing said image $S_{kr}$-quality parameters from the distance between the intermediate quasi-$S_{kr}$-sub-images, their best-fit $S_{kr}$-sub-matrix and the $S_{kr}$-sub-matrices which is used as the theoretical $S_{kr}$-reference.
h) providing a report of the image $S_{kr}$-quality parameters of the generated image and which describes actions to be taken to obtain better results in the next step of the calibration procedure.

In step d) of the present method actual sub-matrices are transformed in intermediate quasi-$S_{kr}$-sub-matrices based on classic (i.e. conventional) or $S_{kr}$-guided least mean square techniques. The term "$S_{kr}$-guided" as used herein refer to the use of knowledge on $S_{kr}$-matrices as defined herein to make calculations and transformations. Because during concrete image analysis different aspects of the image can be analyzed, it will be required to take the general characteristics of the $S_{kr}$-matrix theory into consideration for performing said image analysis. These general characteristics comprise but are not limited to features regarding the cognition numbers, basic components, eigenvalues, Chebyshev- Toeplitz- or Hankel relationships, etc. . . . Thus using the knowledge on the $S_{kr}$-matrix theory as background knowledge, different kind of image characterisctics and parameters can be objectively calculated and determined.

The method preferably further comprises the steps of:
- correcting the image quality parameters of the generated image such that the generated image more closely fits standard image quality parameters in its sub-regions, and
- restoring and visually displaying the generated $S_{kr}$-image after image correction.

In a preferred embodiment, the object is an $S_{kr}$-object which comprises $S_{kr}$-features to some application related level. Examples of suitable $S_{kr}$-objects include but are not limited to High Quality $S_{kr}$-photos, High Quality $S_{kr}$-movies, embedded $S_{kr}$-matrix software, heat radiating shields with $S_{kr}$-matrix related properties, X-, gamma or other ray absorbing material with $S_{kr}$-absorption profiles, etc. . . .

In another preferred embodiment the method is characterized in that said image comprises a sequence of $S_{kr}$-images. Using the same correction principles, consecutive $S_{kr}$-images or $S_{kr}$-image projections can be analyzed and restored. In such case, real time $S_{kr}$-image interpretation is very important. $S_{kr}$-matrix calculations are very well compliant with this kind of analysis and image corrections.

In another embodiment, the reference $S_{kr}$-matrix may also be established as the Kronecker product of two or more reference matrices, having an internal $S_{kr}$-sum-structure. In a preferred embodiment, the reference matrix is established as the Kronecker product of two or more $S_{E1}$-matrices and results in a $S_{Ek}$-matrix (e.g. an $S_{E2}$-matrix), also having just one non-zero eigenvalue. Their Kronecker sub-matrices are used for evaluating specific regions of an $S_{kr}$-image, according to the present method. In addition, these Kronecker sub-matrices too have unique eigenvalues, which means that the partial image $S_{kr}$-quality can be evaluated with the same algorithms. This method opens the way to fractal image analysis.

The following flow charts represent embodiments of the present method. Referring to FIG. 1 a suitable image of an $S_{kr}$-object is generated (as indicated in box 1) by lightning the $S_{kr}$-object and registering the image of the object using a suitable optical device. Examples of suitable optical devices comprise but are not limited to sensors, cameras, scanners, spectrophotometers, etc. . . . For the actual generated $S_{kr}$-image an actual and representative matrix is defined as indicated in box 2. Similarly, reference (test) $S_{kr}$-images, as indicated in box 3 and reference (test) $S_{kr}$-matrices as indicated in box 4 are established for reference $S_{kr}$-images. The term "actual matrix" as used herein refers to a matrix representing the generated $S_{kr}$-image. The representation can be based e.g. on local mean or local median calculations. Each value in this actual matrix corresponds to a pixel or a local group of pixels of the generated $S_{kr}$-image. Notice that the actual matrix is just an image of an $S_{kr}$-matrix but in general its pixel values doesn't follow the $S_{kr}$-sum structure. The reason for this is that a lot of image applications have a non-linear behavior. The term "reference $S_{kr}$-matrix" as used herein refers to a theoretical $S_{kr}$-matrix representing the reference $S_{kr}$-image. The terms reference $S_{kr}$-matrix and reference $S_{kr}$-image are used herein as synonyms. In box 5 the so called intermediate quasi-$S_{kr}$-matrix is calculated. A least mean square calculation is able to find the overall non-linear perception or image production law and reflects the relation between the reference pixels and the real pixel values. The reverse usage of this perception law will bring the real image information in an intermediate and more or less apparatus independent quasi-$S_{kr}$-matrix form. (More or less means that the results will show statistical variations, depending on the representative set of pixels which are used.) The intermediate matrix is named 'the intermediate quasi-$S_{kr}$-matrix'. From this matrix it is determined which $S_{kr}$-matrix most closely fits this quasi-$S_{kr}$-matrix. The result is named 'the best-fit $S_{kr}$-matrix'. This best-fit $S_{kr}$-matrix gives expression to the intrinsic $S_{kr}$-information in the generated image. Once a best fit $S_{kr}$-matrix has been identified as indicated in box 6, its characteristics are evaluated in box 7. The values in both the intermediate matrix and its best-fit $S_{kr}$-matrix are correlated and compared with each other and with the theoretical reference $S_{kr}$-matrix. In practice, the Discrete Sine Transform, the cognition numbers, the basic components and/or eigenvalues of the best-fit $S_{kr}$-matrix are correlated and compared with the corresponding values of the reference $S_{kr}$-matrix. Further evaluations are based on general matrix differences between the independent quasi-$S_{kr}$-matrix, the best fit $S_{kr}$-matrix and the theoretical reference $S_{kr}$-matrix. From this information the image $S_{kr}$-quality parameters of the generated image are deduced in box 8. The magnitude of deviations (values or matrix norms) can be used to classify different apparatuses such as monitors, cameras, printers, night watchers, etc. . . . on the basis of an accepted classification norm. If the image $S_{kr}$-quality parameters of the intermediate quasi-$S_{kr}$-matrix significantly deviate from the standard and desired image quality parameters, better settings are advised in box 9 in order to obtain an optimized image. The determined image $S_{kr}$-quality parameters also provide information which can be fed back to algorithms for fine-tuning. During fine-tuning, the light source and/or electronic or other production parameters are automatically regulated such that the image or image reproduction obtains an optimal $S_{kr}$-quality. Such self-tuning procedures can be driven by a lot of common used and $S_{kr}$-specific principals, like:

adaptive principals which search for the best contrast in the eigenvalue distribution (especially for $S_{kr}$-matrices with just one non-zero eigenvalue), least mean square methods which optimizes matrix distances or other cost functions. Cost function values may result from matrix norm calculations (e.g. $L_2$-norms, Frobenius Norm, eigenvalue(s)-to-noise-ratios, etc. . . . ). $S_{kr}$-matrices may form vector spaces in which distances are properly described.

In practice one can make use of common knowledge about Control Techniques (e.g. Closed Loop Control, State Space Control, Adaptive Control, Fuzzy Logic Control or Neural Network Control) from which it is possible to deal with parameter settings and cycle based adjustments to minimize 'the cost functions'. Referring to box 10, the corrected image having optimized $S_{kr}$-quality can be reproduced and visually displayed on e.g. a monitor, TV screen, GPS screens, HDTV, a printer, LCD screen, etc. . . .

Referring to FIG. 2, a suitable image of an $S_{kr}$-object is generated in box 11 by lightning the object and registering the $S_{kr}$-image of the object using a suitable optical device. An actual matrix is defined for the generated $S_{kr}$-image in box 12. In box 15, reference (test) $S_{kr}$-images are established. For each reference $S_{kr}$-image, a reference (test) $S_{kr}$-matrix is defined in box 16. A specific region of the generated $S_{kr}$-image is selected, as indicated in box 13. For this specific region, also indicated as the region of interest (ROI), an actual sub-matrix is established in box 14 which corresponds to a sub-region of the actual $S_{kr}$-matrix. The term "actual sub-matrix", as used herein refers to every matrix or sub-matrix part representing a sub-region of the generated $S_{kr}$-image. Also for the reference $S_{kr}$-images, a specific region is selected in box 17, which corresponds to a region of interest (ROI) on the generated $S_{kr}$-image. For this specific region a reference (test) $S_{kr}$-sub-matrix is established in box 18. The term "reference $S_{kr}$-sub-matrix", as used herein refers to a $S_{kr}$-matrix part representing a sub-region of a reference $S_{kr}$-image. In the present method, especially Kronecker sub-matrix parts of the image information will be used to find the intermediate quasi-$S_{kr}$-sub-matrices and their associated best-fit $S_{kr}$-sub-matrices. For such results the theoretical counterparts are prepared as reference $S_{kr}$-sub-matrices.

In a more specific embodiment, the reference $S_{kr}$-sub-matrix may be special sub-regions of the reference $S_{kr}$-matrix. The reference sub-matrix may then comprise representative values for pixels from the upper and lower triangular region of the reference $S_{kr}$-image and/or its Kronecker sub-matrices, or values for pixels from the North, South, East and/or West triangular regions of the reference $S_{kr}$-image, or values for pixels in specific rhomb-like or parallelogram-like sub-region of the reference $S_{kr}$-image, or values for pixels from diagonal regions of the reference $S_{kr}$-image, or values for pixels from corner sub-regions of the reference $S_{kr}$-image. It will be clear from the described embodiments that a sub-matrix may also be established corresponding to other (even irregular) sub-regions of the reference $S_{kr}$-matrix. For irregular regions the calculations can be carried out with masks which eliminate the influence of the excluded pixels.

It is in particular noted that the ROI or zone-dependent corrections are worked out for the different Kronecker sub-matrices or parts from it, and not for free chosen regions. Based on the same principals as before but carried out over the specific chosen sub-regions the associated intermediate quasi-$S_{kr}$-sub-matrices and their best-fit $S_{kr}$-sub-matrices are calculated in box 19. The values in both the intermediate and the best-fit $S_{kr}$-forms are correlated and compared to each other and with the reference $S_{kr}$-sub-matrices. In practice, the discrete sine transform, the cognition numbers, basic components and/or eigenvalues of the intermediate $S_{kr}$-sub-matrix are correlated and compared with each corresponding value of the reference $S_{kr}$-sub-matrix. Once the best fit reference $S_{kr}$-sub-matrices have been identified in box 20, and their characteristics are established in box 21, the image $S_{kr}$-quality parameters of the ROI of the generated image can be deduced in box 22. Furthermore, in box 23, the image $S_{kr}$-quality parameters defined for the ROI of the generated $S_{kr}$-image can be transposed to the image $S_{kr}$-quality parameters of the generated $S_{kr}$-image. The magnitude of deviations (values or matrix norms) can be used to classify different apparatuses such as monitors, cameras, printers, night watchers, etc. . . . on the basis of an accepted classification norm. If the image $S_{kr}$-quality parameters of the intermediate quasi-$S_{kr}$-matrices significantly deviate from standard and desired image quality parameters, better settings are advised in box 24 in order to obtain an optimized $S_{kr}$-image, e.g. via self-tuning algorithms as explained above. The corrected $S_{kr}$-image having optimized $S_{kr}$-quality, can then be reproduced and visually displayed as indicated in box 25. After the calibration activity the apparatus and its environment are in optimized conditions. The correction value(s) for each color component in the generated image is determined. After the calibration step one knows how to restore the spatial and the spectral image information. So, for new image production or reproduction the same correction parameters can be applied and leads to pixel values which are closer to the values that would exist in strictly ideal conditions.

Referring to FIG. 3, another embodiment of the present method is illustrated. $S_{kr}$-images are formed in any vision application. For this reason box 28 can be viewed as a central box which represents every optical device that can be used to capture image information. Examples of optical devices include but are not limited to sensors, cameras, scanners, spectrophotometers, cameras, copying machines, printers, etc. . . . . In box 27 are represented so called $S_{k,r}$-objects representing an $S_{k,r}$-matrix structure. A professional lightning system indicated in box 26 makes such objects 'visible' for the different types of cameras. In another application the lightning system illustrated in box 26 may be seen as a radiation source or a laser beam of any type. The radiation is absorbed (or interacts on an other basis) by an absorption plate which has a spatial absorption distribution in the form of an $S_{k,r}$-matrix. The light in transmission will reach any type of radiation detector and an $S_{kr}$-image is formed. In box 27 it is indicated that High Quality Thermal Photos can be taken by a thermal camera when it is exposed to a heat radiating plate with a constant temperature on its boundary. In box 34 the origin of the $S_{kr}$-image formation is based on embedded software or hardware capable of generating bit-maps or other image formats which may produce images as indicated in box 33 on any type of screen, on printers, plotters etc. . . . Optionally, using a continuous stream of image information will lead to High Quality Movies based on $S_{k,r}$-images. Subsequently, the image formed in box 28 is analyzed. In a first step, indicated in box 29, a geometrical correction of the image can be calculated to compensate for deformations in specific device components (e.g. radial distortions due by the lenses, corrections for pixel distributions or a known Bayer pattern on the level of vision sensors . . . ). After finding the region of interest (e.g. on the base of edge detections and image filtering techniques) a typical region in the $S_{kr}$-image can be focused on. Pixels can be selected to form the actual matrix and lead to the input for the calculation of the intermediate quasi-$S_{kr}$-matrix information and its 'best-fit $S_{kr}$-matrix form', as calculated in box 30. The properties of this best-fit $S_{k,r}$-matrix relative to the intermediate and the actual matrix can be used as a base for the error analysis and error explanations shown in box 31. The deviations between the theoretical and practical cognition numbers, basic components or components from the discrete sine transform can be used to find $S_{kr}$-quality numbers which make it possible to give an appreciation of the overall and detailed $S_{kr}$-quality of the vision application. Such $S_{kr}$-quality report may be used as a basis for commercial activities and objective cost calculations. When the report indicates negative results, one can initiate actions which lead to better quality results. In box 32 it is suggested that the corrections can be based on principles of self-tuning or based on operator interventions (e.g. lightening conditions, focus, shutter times, diaphragms . . . ). After a consecutive set of adjustments the application will be in its best $S_{kr}$-quality condition. The systematic errors are explained and the noise is registered. In box 35 it becomes possible to compensate for the most important image deficiencies. The calculations can be worked out on three levels: the overall $S_{kr}$-image correction, the sub-corrections for each Kronecker-$S_{kr}$-sub-region and a local or pixel based correction. At the end of the $S_{kr}$-image restoration task in box 36 the application will generate images on its highest $S_{kr}$-quality level. The principals of closed loop control can be used to keep the $S_{kr}$-quality controlled. For this purpose the 'camera' may look to the $S_{kr}$-objects on a continuous or regular basis.

In a more specified embodiment, a method is characterized in that the image $S_{kr}$-quality parameters of the generated $S_{kr}$-image are determined on a pixel-by-pixel basis by comparing the values of the best-fit $S_{kr}$-matrix representing the pixels of the generated $S_{kr}$-image with the values of a reference $S_{kr}$-matrix, representing the pixels of a reference $S_{kr}$-image. The absolute or relative pixel errors with respect to the actual or intermediate quasi-$S_{kr}$-matrix can be used as spatial and spectral correction values for the integer image. Linked to the actual matrix a restoration of the application specific image production law will be carried out. Linked to the intermediate quasi-$S_{kr}$-matrix an application independent correction will be found which restore the intrinsic input information of the application.

In another preferred embodiment, a method is characterized in that the image $S_{kr}$-quality parameters of the generated $S_{kr}$-image are determined on a zone-by-zone basis by comparing a zone on the best-fit $S_{kr}$-matrix representing the generated image with a corresponding zone on the reference $S_{kr}$-matrix, representing a reference $S_{kr}$-image. Again the restoration can concern the application specific or the input specific information based on the zone depending corrections for the actual matrix or for the independent quasi-Skr-information.

In yet another embodiment, the image $S_{kr}$-quality parameters of the generated image are determined on an image-by-image basis by comparing the best-fit $S_{kr}$-image with a reference $S_{kr}$-image. The $S_{kr}$-quality evaluation may also be based on a sequence of consecutive $S_{kr}$-image: such sequences can be formed with circular and continuous line or column-shifts.

This means that the corrections in the image(s) may be carried out on a fractal basis: e.g. in three steps and related principals. There is a correction to each pixel because it is a member of the $S_{kr}$-image (or $S_{kr}$-sequence) as a hole, and a second correction (sub-correction) because of the pixel is also member of a certain Kronecker $S_{kr}$-sub-region. A third correction is overall-image-related. It is well understood that the three evaluation and correction levels (pixel-to-pixel, zone-by-zone and image-by-image) are $S_{kr}$-matrix based as explained before.

$S_{kr}$-Matrices: An Overview

The reference $S_{kr}$-matrix system used in the present method is based on a remarkable collection of $S_{kr}$-matrices, which are related to the well-known Toeplitz and Hankel matrices. The matrices are characterized by an internal $S_{kr}$-matrix sum structure, wherein k and r are different from zero. After a (discrete or continued) sine transform these matrices are converted in a diagonal matrix or a block diagonal matrix. If the choice of the $S_{kr}$-matrix is well considered, only one eigenvalue differs from zero. Such an S-matrix of order m can be written as $S_{E1}(m)$. Its unique eigenvalue forms the unique representation of this $S_{E1}(m)$-matrix. The same remark can be made for higher order $S_{Ek}$-matrices and some special variants of $S_{Ek,r}$-matrices, all of them with the same property of having just one eigenvalue different from zero.

Referring now to the reference $S_{kr}$-matrices used in the present method, it is explained into more detail how these reference $S_{kr}$-matrices are obtained. In a first step, a first reference $S_{kr}$-image mosaic is formed by a remarkable analytical correlation between the grey levels. Because of its square dimensions, the reference $S_{kr}$-image matrix is called grey value matrix "$^1$Grey(m)". The order m of the Grey(m) matrix depends on the application chosen, e.g.: m=3, 4, 5, . . . infinitum. The values in the matrix go gradually from 0 to 1. Zero in the down left corner and the top right corner and one in the center of the matrix. To fix the thoughts and keep the $S_{kr}$-image conveniently arranged, typical orders are m=15 or m=31. The values of $^1$Grey(m) can be encoded for the relative coordinates of any color component of a color mosaic (RGB, YMCB, CIE-Lab, HSV, color differences R−G, G−B and B−R, . . . ). Individual $S_{kr}$-images can be combined to form four dimensional sequences (colored $S_{k,r}$-matrix-movies).

In a subsequent step the $^1$Grey(m) matrix is multiplied with $4*255/(m+1)^2$. The product of Grey(m) with $4*255/(m+1)^2$ results in the matrix "$^{255}$Grey(m)", scaled from 0 up to 255; the classic 8-bit encoding. Adaptations to more-bit-presentations are easy to execute. Note that from here on the maximum value will be given as upper left index in the name of the $S_{k,r}$-matrices: e.g. $^{255}S_1$.

Remarkable is the particular sum structure of Grey(m), which makes it possible to calculate every grey level from the first row elements. The values $s_1 \, s_2 \ldots s_m$ in this row are named 'cognition numbers' and the following notation for $S_1$-matrices is defined:

$$S_1(m):=[s_1 s_2 s_3 \ldots s_m]_{m \times m}.$$

The further on mentioned higher-order matrices are called "$S_{k,r}$ matrices". Because of its characteristics sum and eigenvector structure every $S_{k,r}$-matrix belongs to a special group of matrices, which form an algebraic vector space. The result of $S_{k,r}$-matrix products or -sums remains $S_{k,r}$-matrices. Also a matrix inversion will not disturb the characteristic sum structure. As an example, the matrix $^{256}$Down(15) can be defined and written as:

$$^{256}\text{Down}(15):=4*[15\ 14\ 13\ 12 \ldots 3\ 2\ 1]_{15 \times 15}.$$

$$\text{Down}(15)/4 = \begin{vmatrix} 15 & 14 & 13 & 12 & 11 & 10 & 9 & 8 & 7 & 6 & 5 & 4 & 3 & 2 & 1 \\ 14 & 28 & 26 & 24 & 22 & 20 & 18 & 16 & 14 & 12 & 10 & 8 & 6 & 4 & 2 \\ 13 & 26 & 39 & 36 & 33 & 30 & 27 & 24 & 21 & 18 & 15 & 12 & 9 & 6 & 3 \\ 12 & 24 & 36 & 48 & 44 & 40 & 36 & 32 & 28 & 24 & 20 & 16 & 12 & 8 & 4 \\ 11 & 22 & 33 & 44 & 55 & 50 & 45 & 40 & 35 & 30 & 25 & 20 & 15 & 10 & 5 \\ 10 & 20 & 30 & 40 & 50 & 60 & 54 & 48 & 42 & 36 & 30 & 24 & 18 & 12 & 6 \\ 9 & 18 & 27 & 36 & 45 & 54 & 63 & 56 & 49 & 42 & 35 & 28 & 21 & 14 & 7 \\ 8 & 16 & 24 & 32 & 40 & 48 & 56 & 64 & 56 & 48 & 40 & 32 & 24 & 16 & 8 \\ 7 & 14 & 21 & 28 & 35 & 42 & 49 & 56 & 63 & 54 & 45 & 36 & 27 & 18 & 9 \\ 6 & 12 & 18 & 24 & 30 & 36 & 42 & 48 & 54 & 60 & 50 & 40 & 30 & 20 & 10 \\ 5 & 10 & 15 & 20 & 25 & 30 & 35 & 40 & 45 & 50 & 55 & 44 & 33 & 22 & 11 \\ 4 & 8 & 12 & 16 & 20 & 24 & 28 & 32 & 36 & 40 & 44 & 48 & 36 & 24 & 12 \\ 3 & 6 & 9 & 12 & 15 & 18 & 21 & 24 & 27 & 30 & 33 & 36 & 39 & 26 & 13 \\ 2 & 4 & 6 & 8 & 10 & 12 & 14 & 16 & 18 & 20 & 22 & 24 & 26 & 28 & 14 \\ 1 & 2 & 3 & 4 & 5 & 6 & 7 & 8 & 9 & 10 & 11 & 12 & 13 & 14 & 15 \end{vmatrix}.$$

It is noted that for the central element the value 256 or 255 can be taken. For $S_{k,r}$-image image calculation purpose "$^{255}$Down(m)=255/256*Down" in double precision is used, for 8-bit image definition integer values "$^{255}$Down(m)=Down(m)−ones(m)" are used, which strictly looses their $S_1$-matrix structure.

The sum structure of $S_1$-matrices becomes more clear if they are subdivided in their two subsystems: $S_{1E}$, a matrix having the even components of $S_1$ and $S_{1O}$, a matrix having the odd components of $S_1$. The non-zero cognition numbers in both matrices can be chosen independently.

It is noted that if needed, zero values (or specific values like 127, 255 . . . ) can be allocated systematically into the reference $S_{k,r}$-matrices. In case of video screens and cameras it becomes possible to investigate on the amount of charge leakage towards neighboring pixels, and this in proportion to the intensity level of a pixel at aim. The following example represents the division of $^{256}$Down(15) in $D_E$ en $D_O$:

$$D_E = 4 * [15\ 0\ 13\ 0\ 11\ 0\ \ldots\ 3\ 0\ 1]_{15 \times 15}$$

$$= \begin{vmatrix} 15 & 0 & 13 & 0 & 11 & 0 & 9 & 0 & 7 & 0 & 5 & 0 & 3 & 0 & 1 \\ 0 & 28 & 0 & 24 & 0 & 20 & 0 & 16 & 0 & 12 & 0 & 8 & 0 & 4 & 0 \\ 13 & 0 & 39 & 0 & 33 & 0 & 27 & 0 & 21 & 0 & 15 & 0 & 9 & 0 & 3 \\ 0 & 24 & 0 & 48 & 0 & 40 & 0 & 32 & 0 & 24 & 0 & 16 & 0 & 8 & 0 \\ 11 & 0 & 33 & 0 & 55 & 0 & 45 & 0 & 35 & 0 & 25 & 0 & 15 & 0 & 5 \\ 0 & 20 & 0 & 40 & 0 & 60 & 0 & 48 & 0 & 36 & 0 & 24 & 0 & 12 & 0 \\ 9 & 0 & 27 & 0 & 45 & 0 & 63 & 0 & 49 & 0 & 35 & 0 & 21 & 0 & 7 \\ 0 & 16 & 0 & 32 & 0 & 48 & 0 & 64 & 0 & 48 & 0 & 32 & 0 & 16 & 0 \\ 7 & 0 & 21 & 0 & 35 & 0 & 49 & 0 & 63 & 0 & 45 & 0 & 27 & 0 & 9 \\ 0 & 12 & 0 & 24 & 0 & 36 & 0 & 48 & 0 & 60 & 0 & 40 & 0 & 20 & 0 \\ 5 & 0 & 15 & 0 & 25 & 0 & 35 & 0 & 45 & 0 & 55 & 0 & 33 & 0 & 11 \\ 0 & 8 & 0 & 16 & 0 & 24 & 0 & 32 & 0 & 40 & 0 & 48 & 0 & 24 & 0 \\ 3 & 0 & 9 & 0 & 15 & 0 & 21 & 0 & 27 & 0 & 33 & 0 & 39 & 0 & 13 \\ 0 & 4 & 0 & 8 & 0 & 12 & 0 & 16 & 0 & 20 & 0 & 24 & 0 & 28 & 0 \\ 1 & 0 & 3 & 0 & 5 & 0 & 7 & 0 & 9 & 0 & 11 & 0 & 13 & 0 & 15 \end{vmatrix}$$

$$D_O = 4 * \begin{bmatrix} 0 & 14 & 0 & 12 & 0 & 10 & 0 & \ldots & 0 & 2 & 0 \end{bmatrix}_{15 \times 15}$$

$$= \begin{vmatrix} 0 & 14 & 0 & 12 & 0 & 10 & 0 & 8 & 0 & 6 & 0 & 4 & 0 & 2 & 0 \\ 14 & 0 & 26 & 0 & 22 & 0 & 18 & 0 & 14 & 0 & 10 & 0 & 6 & 0 & 2 \\ 0 & 26 & 0 & 36 & 0 & 30 & 0 & 24 & 0 & 18 & 0 & 12 & 0 & 6 & 0 \\ 12 & 0 & 36 & 0 & 44 & 0 & 36 & 0 & 28 & 0 & 20 & 0 & 12 & 0 & 4 \\ 0 & 22 & 0 & 44 & 0 & 50 & 0 & 40 & 0 & 30 & 0 & 20 & 0 & 10 & 0 \\ 10 & 0 & 30 & 0 & 50 & 0 & 54 & 0 & 42 & 0 & 30 & 0 & 18 & 0 & 6 \\ 0 & 18 & 0 & 36 & 0 & 54 & 0 & 56 & 0 & 42 & 0 & 28 & 0 & 14 & 0 \\ 8 & 0 & 24 & 0 & 40 & 0 & 56 & 0 & 56 & 0 & 40 & 0 & 24 & 0 & 8 \\ 0 & 14 & 0 & 28 & 0 & 42 & 0 & 56 & 0 & 54 & 0 & 36 & 0 & 18 & 0 \\ 6 & 0 & 18 & 0 & 30 & 0 & 42 & 0 & 54 & 0 & 50 & 0 & 30 & 0 & 10 \\ 0 & 10 & 0 & 20 & 0 & 30 & 0 & 40 & 0 & 50 & 0 & 44 & 0 & 22 & 0 \\ 4 & 0 & 12 & 0 & 20 & 0 & 28 & 0 & 36 & 0 & 44 & 0 & 36 & 0 & 12 \\ 0 & 6 & 0 & 12 & 0 & 18 & 0 & 24 & 0 & 30 & 0 & 36 & 0 & 26 & 0 \\ 2 & 0 & 6 & 0 & 10 & 0 & 14 & 0 & 18 & 0 & 22 & 0 & 26 & 0 & 14 \\ 0 & 2 & 0 & 4 & 0 & 6 & 0 & 8 & 0 & 10 & 0 & 12 & 0 & 14 & 0 \end{vmatrix}$$

The algorithm to generate $S_1$ matrices can run in every package having the possibility to define nested loops and to execute elementary calculations. If such a package is also able to process images, a quite variable collection of calibration calculations can be executed. There can be thought of Matlab, Mathcad, LabVIEW, Visaul C, C++, Visual Basic, Delphi, FPGA's and other forms of embedded software. Starting from a vector K of cognition numbers the Matlab program for the algorithm looks like:

function $A$=Smatrix($K$)

siz=size($K$); $m$=siz(2); $N$=$m$+1

$A$=zeros($m$);

for $i$=1:floor($N$/2)

for $j$=$i$: $N$-$I$ for $k$=$j$-$i$+1:2:$j$+$i$-1

$A(i,j)$=$A(i,j)$+$K(k)$; end % a sum structure $A(j,i)$=$A(i,j)$ $A(N$-$i,N$-$j)$=$A(i,j)$;

$A(N$-$j,N$-$i)$=$A(j,i)$;end;end;

On the same basis $P_1$-matrices are defined in such a way that the logarithm of the P-matrix elements leads to an S-matrix: log $P_{ij}$=$S_{ij}$; i,j=1:m.

The algorithm to generate P-matrices looks like:

function $A$=$P$matrix($K$)

siz=size($K$); $N$=siz(2)+1;

$A$=zeros($N$-1);

for $i$=1:floor($N$/2)

for $j$=$i$:$N$-$i$ for $k$=$j$-$i$+1:2:$j$+$i$-1

$A(i,j)$=$A(i,j)$*$K(k)$; end % a product structure $A(j,i)$=$A(i,j)$;

$A(N$-$i,N$-$j)$=$A(i,j)$;

$A(N$-$j,N$-$i)$=$A(j,i)$; end; end;

Such P-matrices are important in feed forward control strategies: e.g. if one knows that a camera or a monitor screen reacts logarithmic, the presentation of a P-matrix results in a perception or behavior that fits the S-matrices.

A further embodiment involves potential useful matrix variants which can be used as reference matrices in the method. Some of them keep their $S_{kr}$-structure, other don't but a simple recalculation restores this $S_{kr}$-structure.

Up(m) matrices defined as $S_1$-matrices with integer and up going cognition numbers. For instance $^{256}$Up(31):=$[1\ 2\ 3\ 4\ \ldots\ 29\ 30\ 31]_{31 \times 31}$ $^1$Grey(m) matrices defined like $^{256}$Up(m) or $^{256}$Down(m) matrices but scaled to the interval (0,1). For instance: $^1$Grey(31)=1/256*$[1\ 2\ 3\ \ldots\ 29\ 30\ 31]_{31 \times 31}$ $^{256}$Down(m) matrices defined as $S_1$-matrices with integer and down going cognition numbers. For instance: $^{256}$Down(31)=$[31\ 30\ 29\ \ldots\ 4\ 3\ 2\ 1]_{31 \times 31}$ $^{256}$Equal(m) matrices defined as $S_1$-matrices with integer and equal cognition numbers. For instance: $^{256}$Equal(31)=$[8\ 8\ 8\ 8\ \ldots\ 8\ 8\ 8\ 8\ 8\ 8]_{31 \times 31}$ cUp(m) matrices: the 256-complement of $^{256}$Up(m). For instance cUp(31)=256*ones(31)−Up(31).

cGrey(m)matrices: the "ones"-complement of $^1$Grey(m). For instance: cGrey(31)=ones(31)−$^1$Grey(31).

cDown(m) matrices: the 256-complement of $^{256}$Down(m). For instance: cDown(31)=256*ones(31)−$^{256}$Down(31).

cEqual(m) matrices: the 256-complement of Equal(m). For instance: cEqual(31)=256*ones(31)−$^{256}$Equal(31).

Calibration matrices. For instance, Cal(31) is derived from Down(31). The matrix elements from the "western and eastern sub-triangle-matrix" are complemented against the value 255. Almost every grey-value between 0 en 255 can be found in the image.

Updown(m) matrices. For instance, $^{256}$Updown(31):=2*$[1\ 2\ 3\ \ldots\ 15\ 16\ 15\ \ldots\ 3\ 2\ 1]_{31 \times 31}$ shows four symmetry axes and has, in relation to $^{256}$Down(m), a better contrast between the biggest and second eigen-value (4207/16). The central part of the image is more flattened.

an $S_{E1}(m)$ matrix. This is an $S_1$-matrix having theoretically just one non-zero eigenvalue. Like in the Updown(m)-matrix four symmetry axes (diagonals and meridians) are found. This matrix will be discussed in detail further on.

an $S_{E1,2}(m_1.m_2)$. This matrix is the result of the Kronecker product of $S_{E1,1}(m_1)$ and $S_{E1,2}(m_2)$. The Kronecker product maintains the characteristic that only one non-zero eigenvalue is kept.

An Helmhotz-$\pi^2$-image. Such image follows the Helmholtz-differential equation and delivers a good spread of the CIExy coordinates (or other three stimuli coordinates) in the reference $S_{kr}$-images. This type (and many others like $S_{kr}$-matrices with power series, sine and cosine based cognition functions) delivers possibilities to become an equal spread of colors in the $S_{kr}$-images and a balanced color continuum.

In a further embodiment, the $S_{k,r}$-matrices can be written as the difference of a Toeplitz- and a Hankel like matrix structure. A "Toeplitz matrix" as used herein is defined as a square matrix whose $(i,j)^{th}$ entry only depends on the value $|i-j|$. This means that the matrix elements in the principal-diagonal direction are equal. For Hankel matrices the matrix elements in the sub-diagonal direction are constant. The $(i,j)^{th}$ entry only depends on $(i+j)$. In the present application the Toeplitz en Hankel-matrices are symmetric. The (m+2) numbers, resulting from such decomposition, are called the "basic components" $C_r$; r=0:N; N:=m+1". Together these components have m degrees of freedom for m+2 values. Depending on the numerical context there can be chosen:

$$C_0 = C_1 = 0; \text{ or, } C_m = C_N = 0; \text{ or, } C_{N/2-1} = x, C_{N/2} = 0$$

and $C_{N/2+1} = -x$ $$S_1 = T - H$$

$$= \begin{vmatrix} C_0 & C_1 & C_2 & \ldots & C_{m-1} \\ C_1 & C_0 & C_1 & \ldots & C_{m-2} \\ C_2 & C_1 & C_0 & \ldots & C_{m-3} \\ & & & & \\ C_{m-2} & C_{m-3} & \ldots & C_0 & C_1 \\ C_{m-1} & C_{m-2} & \ldots & C_1 & C_0 \end{vmatrix} - \begin{vmatrix} C_2 & C_3 & C_4 & \ldots & C_N \\ C_3 & C_4 & C_5 & \ldots & C_m \\ C_4 & C_5 & C_6 & \ldots & C_{m-1} \\ & & & & \\ C_m & C_N & & \ldots & C_3 \\ C_N & C_m & & \ldots & C_2 \end{vmatrix}$$

Toeplitz matrix      Hankel matrix

In the analysis of a calibration $S_{kr}$-image, the averages and the standard deviations of the diagonal numbers can be used as norm figures to express the recording $S_{kr}$-quality. Higher-order $S_{kr}$-matrices have comparable split properties. Towards $S_2$ matrices a decomposition in four parts is possible: $S_2$=TT−TH−HT+HH. In this case the basic components become "basic matrices" which, on their turn could be split in Toeplitz and Hankel forms, and therefore the four combinations TT, TH, HT and HH will exist.

The eigenvalues $e_p$ and eigenvectors $E_p$ of a matrix represent the integrity of the internal structure in its most compact form. This is also true for $S_{kr}$-image matrices. The orthonormal eigenvectors of an $S_1$-matrix of order m can be expressed in the form:

$$E_p := \text{sqrt}(2/N) * \sin(\pi * p * q * /N), N := m+1; p, q = 1:m$$

Notice that the eigenvector matrix E is symmetric which also means that $E=E^{-1}=E'$ and for higher order $S_k$-matrices results as the corresponding Kronecker product of first-order $S_1$-eigenvector matrices. The eigenvalues of $S_1$ can be calculated from every "odd row" or "odd column", and particularly from the cognition numbers $S_k$:

$$e_p = [\Sigma_k s_k * \sin(\pi p k/N)]/\sin(\pi p/N); p = 1:m, k = 1:m. \text{ (from the cognition numbers)};$$

$$e_p = [\Sigma_k s_{ik} * \sin(\pi p k/N)]/\sin(\pi p i/N); p = 1:m, k = 1:m \text{ (from the odd rows)};$$

$$e_p = [\Sigma_k s_{kj} \sin(\pi p k/N)]/\sin(\pi p j/N); p = 1:m, k = 1:m \text{ (from the odd columns)};$$

In numerical practice the numerical calculation can make use of the recursive property of the Chebyshev function $U_k(x)$ defined as:

$$\sin[(k+1)\psi]/\sin \psi = U_k(2 \cdot \cos \psi)$$

$$U_o(x) = 1; U_1(x) = x; U_{k+1}(x) = x \cdot U_k(x) - U_{k-1}(x).$$

The matrix $^{256}$Down(m) only has positive eigenvalues. They correspond to the formula:

$$e_p = 256/(N \cdot \sin^2(\pi p/2N)), p = 1:m; N = m+1.$$

The matrix $^{255}S_{E1}(m)$ has one non-zero eigenvalue which is equal to $e_1 = 255 * (m+1)/2$. The basic components $C_r$, r=0:N, can be determined out of the rows and columns or from the Toeplitz-Hankel split, but also from the eigenvalues:

$$C_r = \Sigma_p e_p * \cos(\pi p/N)/N; r = 0:N$$

The structure of the eigenvector matrix implies that the $S_{kr}$-image mosaics or a well chosen part or selection from it theoretically transforms into an eigenvalue diagonal matrix after applying a Discrete Sine Transform (DST). Matrix deformations can be single valued coupled to deformations of the image forming physics (e.g.: illumination, reflection, lenses, image screen, image recording and/or image formation electronics) and have a direct and sensitive impact on the results of the DST.

$S_{kr}$-matrices can be continuated. In the context of image technology this means that the pixel density may increase up to infinitum. During the continuation of $S_{kr}$-matrices the cognition numbers transform into a "cognition function s(y)", the basic components into a "basic function C(z)", the eigenvalues in an "eigenvalue function e(y)", and the matrix elements in a "matrix element function s(x,y)". For example we consider the continuation of the matrix Down(m). After a limit transition, by which m goes to infinity, a continuous reference matrix is obtained. After a row or column filtering (with kernel [−1 2−1]) the principal diagonal is marked. The sub-diagonal axis, perpendicular to the principal one, divides it in two symmetric parts and the image centre is found. During $S_{kr}$-image evaluation, by fixating a number of screen dots, it's possible to express image $S_{kr}$-quality as the difference of the theoretical values and the observed intensities in the corresponding intermediate quasi-$S_{k,r}$-sub-matrices. If the axes are situated centrally (with the matrix-diagonals under 45°) the theoretical $^{255}$Down(m)-matrix (m is odd) will have following matrix-elements:

$$S_{I,J} = 255 * (N+2I) * (N-2J)/N^2; I = -N/2:N/2; J = I:N-I;$$
$$N = m+1.$$

Starting with an orthonormalized eigenvector matrix, like the matrix E from $S_1$-matrices, it is always possible to find the vector space which it spans. Hereby it suffices to choose the base $\Lambda_k$, k=1:m, having all eigenvalues equal to zero, except one (on place k) which is equal to the unity. The first matrix $(E.\Lambda_1 E)$ from them seems to have positive values between 0 and 1 and therefore it can be associated with a grey scale image. Using the theory for $S_1$-matrices one can find respectively:

the defined eigenvalue matrix $\Lambda_1:=\text{diag}(1\ 0\ 0\ \ldots\ 0)_{m\times m}$ the symmetric eigenvector matrix $E:=\text{sqrt}(2/N)*\sin(\pi pq/N)$, $N:=m+1$; $p,q=1:m$ the specific matrix $B:=E\Lambda_1 E$, $$B=2*\sin(\pi/N)/N*[\sin(\pi/N)\sin(2\pi/N)\ldots\sin(m\pi/N)]_{m\times m}$$

the central (=maximum) element when m is odd: $B_{N/2,N/2}=2/N$.

Within the objective of executing 8-bit image evaluation we will look further to the special matrix $^{255}S_{E1}(m):=255*N*B/2$ where the central element is 255. $^{255}S_{E1}$ has the following particular characteristics:

the only non-zero eigenvalue is equal to $e_1=255*N/2$, as basic components can be taken: $C_r=255*\cos(\pi r/N)/2$; $r=0:N$.

the cognition numbers are equal to:

$$s_k=255/2*[\cos(\pi(k+1)/N)-\cos(\pi(k-1)/N)]$$

$$s_k=255*\sin(\pi/N)*\sin(\pi k/N); k=1:m.$$

This makes it possible to write the matrix $^{255}S_{E1}$ as follows:

$$S_{E1}=255\sin(\pi/N)*[\sin(\pi/N)\sin(2\pi/N)\ldots\sin(m\pi/N)]_{m\times m}$$

Using the Kronecker product for matrices, higher-order matrices with similar characteristics can be formed. A useful variant is the so-called $S_{E2}$-matrix of order $((m_1\times m_2)\times(m_1\times m_2))$, also having one non-zero eigenvalue and which is the result of the Kronecker product (•)

$$S_{E2}:=S_{E11}(m_1)*S_{E12}(m_2).$$

In a similar way the result of the Kronecker product of the $S_{E1}(m_1)$-matrix and the Matlab function "ones($m_2$)" can be used as reference $S_{k,r}$-matrices in image calibration. At some level of coincidence "ones(m)" too has only one eigenvalue different from zero. In comparison with $S_{E2}$ its intensity is more equally dispersed in the complete image field. Down2 (15×6) is an example of an $S_{2,1}$-matrix. This reference $S_{k,r}$-image is the result of the Kronecker product of $^{255}$Down(15) and Ones(6).

In conclusion, $S_{k,r}$-matrices used in some embodiments have remarkable characteristics and are very useful for image technology. The most important are:

a unique internal sum structure, which is related to the so-calledb principal numbers or cognition numbers. These are the first row (or column) elements of the matrix, the possibility to split the matrix in combinations of Toeplitz and Hankel matrices, leading to the so-called basic components, the characteristics of a 'vector space' as a result of the link between the sum structure and the eigenvectors, the possibility of dividing the matrix in components containing respectively the 'even' and 'odd' matrix elements. In some cases this results in two, respectively two-times-two equal eigenvalues. In such division every pixel is flanked by four black (or grey valued) neighbors, which implicates that the apparatus' elementary pixel quality can be evaluated in relation to the nearest neighbor pixels, the possibility of the continuation of the $S_{k,r}$-matrices follows the calibration of extreme high resolution images, the compatibility of the internal sum structure with the logarithmic, exponential or other non-linear behavior of visual sensors and non-linear image transformation commonly used in digital image technology, processors, PC's or FPGA's with elementary mathematical skills and sufficient memory are able to generate and manipulate $S_{k,r}$-matrices quite easy.

Special reference $S_{k,r}$-matrices can be defined which have just one non-zero eigenvalue. The same property can be found on a fractal basis in the Kronecker-sub-matrices or parts of them.

Best-fit $S_{k,r}$-calculations are easy to carry out and use the classic best fit calculations as a first step.

Use

As described before embodiments thus provides a method for image evaluation-, camera calibration- and image restoration. This method can be used in the field of image recording and the general field of image processing. Specific applications could be: digital video, photography, reprography, scanners, monitors and screens, image restoration technology, etc. . . . Cameras may include but are not limited to grey level- and color cameras, analogue cameras, CCD- and CMOS-cameras, instant image cameras and the like. Scanners may include but are not limited to line scanners, or scanners based on X-rays, γ-rays or laser-rays. Screen types may include but are not limited to CRT, HDTV, TFT, GPS screens, plasma screens.

In the field of image evaluation, camera calibration and image restoration, these characteristics enable to obtain objective information about:

the gamma-factor, which marks a vision component, the cameras sensitivity for illumination non-uniformity and asymmetry, the 'image transfer function' which explains the loss of information or the creation of noise and systematic errors made by a particular vision component (e.g. the lenses, shift operations in CCD camera's, mirroring components, image compression . . . ).

objective measurements for reflection properties of materials (photographic paper, art reproduction . . . ), the camera's actual and zone depending illumination conditions when using a light filter with a transparency for, for instance "grey values" or "red, green and blue" or other filter types having the pattern of an $S_{k,r}$-matrix, the presence and degree of image noise, the level of sharpness, the aberrations in horizontal/vertical and diagonal directions, V-shaped coherence, corner deviations, the gamut in the color space (i.e. the range of colors and tones a device is capable of recording or reproducing) available during the image recording and the 2D image reproduction, the charge leakage towards neighboring pixels in cameras, the lens quality and deformations of the Euclidean space, the cameras geometric outlining degree (position and angle value), the space and spectral correction values for image restoration purposes.

the correct identification of typical color pigments and the evaluation of their level of pureness.

A special class of filters can be associated to finite difference calculations for partial differential equations, because this is exactly the field in which the $S_{k,r}$-matrix theory originates.

Previous analysis can be worked out for PC or FPGA (software or hardware approach). If time is not a constraint calculation can follow eigenvalue and eigenvector guidelines. For real time applications the calculations should be more simplified and the calculations over basic components or cognition numbers are recommended. Both techniques make it possible to deal with non-linearity in the field of image production and image perception, especially when feed forward principals are built in. Embodiments also relate to the use of a reference $S_{k,r}$-matrix system for evaluating color coordinates, including but not limited to RGB, HSV, YMCB, CIELab, YCrCb, and their linear and non-linear transformations, for evaluating image resolutions, including but not limited to (8-bit, 12-bit, etc. . . . ) and for evaluating all types of image formats, including but not limited to 1×1024; 480× 640; 1024×1280 pixels; up to infinitum.

Some embodiments also relate to the use of a reference $S_{k,r}$-matrix system for evaluating the quality and the authenticity of banknotes or other official documents. In an example, a suitable light source illuminates the document, and a camera registers and evaluates the coherence of colors in a selected region of the document. Interpretations are added and compared to other evaluations and a final report of quality and authenticity is established. On the same basis one can use $S_{k,r}$-eigenvalue sequences as electronic signature properties. A good eigenvalue combination leads to correct $S_{k,r}$-matrix results and offers a gateway to an other facility.

Application Fields and Strategy

In one embodiment, the test $S_{k,r}$-matrix system is in particular suitable for being used in the field of photography, in particular for evaluating the $S_{k,r}$-quality of cameras and for calibrating a camera. Practically a photo is taken by the camera and delivered as a bitmap to a $S_{k,r}$-evaluation program (PC based or Embedded Software based). An $S_{k,r}$-quality report is generated. The results in the report describe the quality of the camera. Image correction data is calculated for color and geometrical aberrations. The corrections take into account the known quality of the illumination and photographic paper. The $S_{k,r}$-quality information can be used for camera quality control and fine-tuning during the production.

In another embodiment, the test $S_{k,r}$-matrix system is in particular suitable for evaluating the $S_{k,r}$-quality of a digital camera and for calibrating a digital camera. An $S_{k,r}$-image sequence is analyzed and the results are delivered as a bitmap-stream to an $S_{k,r}$-evaluation program (PC based or Embedded Software based). An $S_{k,r}$-quality report is generated and camera correction data is calculated for color and geometrical aberrations. The corrections take into account the known quality of the connected monitor. The quality information can be used for camera quality control and fine-tuning during the production. When a (digital) camera is bought the consumer gets a certified $S_{k,r}$-quality document. Inside the (digital) camera there is an EPROM which holds the correction information. This EPROM may be reloaded online (e.g. twice a year) with new settings in a certified photo shop. When taking new pictures with the camera or new movies with the digital camera, it will be possible to choose for geometrical and color correction mode with a switch.

In another embodiment, the test $S_{k,r}$-matrix system is in particular suitable for evaluating the quality of a digital scanner or photocopier and for calibrating such devices. Practically, an $S_{k,r}$-image is scanned and the result is delivered as a bitmap to an $S_{k,r}$-evaluation program (PC based or Embedded Software based). An $S_{k,r}$-quality report is generated and scanner correction data is calculated for color and geometrical aberrations. The $S_{k,r}$-quality information can be used for scanner quality control and fine-tuning during the production. When a scanner is bought the consumer gets a certified $S_{k,r}$-quality document. Inside the scanner there is an EPROM which holds the correction information. This EPROM may be reloaded online (e.g. twice a year) with new settings in a certified shop. When new pictures are scanned, it will be possible to choose for color correction mode with a switch.

In yet another embodiment, the test $S_{k,r}$-matrix system is in particular suitable for evaluating the quality of printers and plotters and for calibrating such devices. Practically, for printing purposes a downloadable set of reference $S_{k,r}$-matrices on the Internet (like ICC-color-profiles are used now) is sent to a printer or plotter. The print-out is scanned or line scanned and the result(s) is delivered as a bitmap to an $S_{k,r}$-evaluation program (PC based or Embedded Software based). An $S_{k,r}$-quality report is generated and printer correction data is calculated for color and geometrical aberrations. The corrections deal with the known quality of the connected scanner. The quality information can be used for fine-tuning each printer or plotter when produced. When a printer or plotter is bought the consumer gets a certified $S_{k,r}$-quality document. Inside the printer or plotter there is an EPROM which holds the correction information. This EPROM may be reloaded after new calibration activities which can be done by the user himself or with the support of a technician. When new pictures are printed or plotted, it will be possible to correct the colors as far as the gamut of the printer or plotter reaches.

In yet another embodiment, the test $S_{k,r}$-matrix system is in particular suitable for evaluating the quality of screens such as TVs, monitors, video screen or the like and for calibrating such devices. Practically, for screen evaluation purposes a downloadable set of reference $S_{k,r}$-image sequences on the Internet is sent to a screen (e.g. over a VGA connector). The result on the screen can be analyzed in different directions by a line scanner and the result is delivered line-by-line to an $S_{k,r}$-evaluation program (PC based or Embedded Software based). An $S_{k,r}$-quality report is generated and screen corrections are calculated for color and geometrical aberrations. The corrections deal with the known quality of the connected scanner. The quality information can be used for individual fine-tuning of each monitor when produced. When a screen or monitor is bought the consumer gets a certified quality document. Inside the screen there is an EPROM which holds the correction information. This EPROM may be reloaded online (e.g. once a year) with new settings in a certified shop. When new movies are send they can be corrected for geometrical aberrations and for colors, as far as the gamut of the screen reaches.

In yet another embodiment, the test $S_{k,r}$-matrix system is in particular suitable for evaluating the quality of projectors and projection screens or the like and for calibrating such devices. Practically, for projector evaluation purposes a downloadable $S_{k,r}$-image-movie on the Internet is forwarded to a projector (e.g. over a VGA connector). The result is projected in a box which contains a High Quality Projection Screen. The screen can be recorded in different directions by a build in or separate color camera and the result is delivered to an $S_{k,r}$-evaluation program (PC based or Embedded Software based). An $S_{k,r}$-quality report is generated and the projector correction data is calculated for color and geometrical aberrations. The corrections deal with the known quality loss of the projection screen. The quality information can be used for fine-tuning of each monitor when produced. When a projector is bought the consumer gets a certified $S_{k,r}$-quality document. Inside the projector there is an EPROM which holds the correction information. This EPROM may be reloaded after new calibration activities which can be done by the user himself or with the support of a technician. When new images are send they can be corrected for lens aberrations and colors as far as the gamut of the projector and the screen reaches.

In yet another embodiment, the test $S_{k,r}$-matrix system is in particular suitable for Industrial Vision Applications. Practically, for Industrial Vision Applications there is provided a grey scale or colored $S_{k,r}$-mosaic on a "High Quality Reflective or Transparent Substrate" nearby the region of interest. The industrial camera takes a picture of this scene and sends a bitmap to an $S_{k,r}$-evaluation program (PC based or Embedded Software based). An $S_{k,r}$-quality report is generated and industrial vision correction data is calculated for color and geometrical aberrations. The quality information can be used for fine-tuning of each industrial application. When an application is carried out the company gets a certified $S_{k,r}$-quality document. Inside the industrial camera there is an EPROM which holds the correction information. This EPROM may be reloaded after new calibration activities which can be done by the user himself or with support of a technician. When new pictures are taken they can be corrected for geometrical and color aberrations.

In yet another embodiment, the test matrix system is in particular suitable for evaluating the quality of infrared cameras and for calibrating such devices. Practically, for thermal photographic purposes a heat-conditioned box with a thermal radiating plate having a constant temperature on its boundary (A High Quality Thermal Photo) is provided. A photo is taken and the result is delivered as a bitmap to an $S_{k,r}$-evaluation program (PC based or Embedded Software based). An $S_{k,r}$-quality report is generated and image correction data is calculated. The quality information can be used for fine-tuning of each camera when produced for thermal and geometrical aberrations. When an infrared camera is bought the consumer gets a certified $S_{k,r}$-quality document. Inside the camera there is an EPROM which holds the correction information. This EPROM may be reloaded (e.g. twice a year) with new settings by a certified distributor. When new thermal $S_{k,r}$-pictures are taken they can be corrected for geometrical and thermal aberrations.

In yet another embodiment, the test $S_{k,r}$-matrix system is in particular suitable for evaluating the quality of line scanners and for calibrating such devices. Practically, for line scanning purposes a grey scale or colored $S_{k,r}$-mosaic is provided on High Quality Photographic Paper and, if necessary, controlled illumination conditions. This $S_{k,r}$-picture is scanned and the result is delivered line by line to an $S_{k,r}$-evaluation program (PC based or Embedded Software based). An $S_{k,r}$-quality report is generated and line scanner correction data is calculated for color and geometrical aberrations. The quality information can be used for fine-tuning of each line scanner when produced. When a line scanner is bought the consumer gets a certified $S_{k,r}$-quality document. Inside the line scanner there is an EPROM which holds the correction information. This EPROM may be reloaded online (e.g. twice a year) with new settings by a certified distributor. When new images are scanned they can be corrected for colors.

In yet another embodiment, the test $S_{k,r}$-matrix system is in particular suitable for evaluating the quality of X-, gamma or laser-rays scanners and for calibrating such devices. Practically, for X-, gamma or laser-rays measuring purposes a box with a controlled radiation source and a High Quality Absorption Filter, which absorbs the rays conform a $S_{k,r}$-pattern, is provided. This pattern covers the range of absorption values needed in a particular application. The digital result is delivered to an $S_{k,r}$-evaluation program (PC based or Embedded Software based). An $S_{k,r}$-quality report is generated and image correction data is calculated for intensity and geometrical aberrations. The quality information can be used for fine-tuning of each scanner when produced. When an X-, gamma or laser-ray scanner is bought the consumer gets a certified $S_{k,r}$-quality document. Inside the X-, gamma or laser-ray scanner there is an EPROM which holds the correction information. This EPROM may be reloaded after new calibration activities which can be done by the user himself or with support of a technician. We suggest a calibration before every important scan. When new scans are made, they may be corrected corresponding to the different absorption values.

In yet another embodiment, the test $S_{k,r}$-matrix system is in particular suitable for evaluating the quality of microscopes and for calibrating such devices. Practically, for microscopic purposes there is provided a micro-film with a grey scale or colored $S_{k,r}$-mosaic on a High Quality (Transparent) Microfilm Substrate. The microscope camera takes an $S_{k,r}$-picture of this scene and sends a bitmap to an $S_{k,r}$-evaluation program (PC based or Embedded Software based). An $S_{k,r}$-quality report is generated and microscopic image correction data is calculated for color and geometrical aberrations. The quality information can be used for fine-tuning of each microscope when produced. When a microscope is bought the consumer gets a certified $S_{k,r}$-quality document. Inside the microscope there is an EPROM which holds the correction information. This EPROM may be reloaded after new calibration activities which can be done by the user himself or with support of a technician. When new pictures are taken, they can be corrected for geometrical and color aberrations.

In yet another embodiment, the test $S_{k,r}$-matrix system is in particular suitable for evaluating the quality of color scanners and color reproduction such as paint and pigments mixings and for calibrating such devices. A colored $S_{k,r}$-mosaic is provided on High Quality Photographic Paper. The color mosaic is scanned color by color and the result is delivered as a byte stream to a $S_{k,r}$-evaluation program (PC based or Embedded Software based). An $S_{k,r}$-quality report is generated and separate color correction data is calculated. The $S_{k,r}$-quality information can be used for fine-tuning of each color scanner when produced. When a color scanner is bought the consumer gets a certified quality document. Inside the color scanner there is an EPROM which holds the correction information. This EPROM may be reloaded online (e.g. twice a year) with new settings by a certified distributor. When new colors are scanned color correction can be carried out.

In yet another embodiment, the test $S_{k,r}$-matrix system is in particular suitable for evaluating grey scale or color transfer_ functions for isolated components. For general purposes a grey scale or colored $S_{k,r}$-mosaic or $S_{k,r}$-mosaic-movie is provided on a High Quality Basis. The $S_{k,r}$-information is sent through a typical device component and is damaged for a certain amount. The transfer results are delivered as an information stream to an $S_{k,r}$-evaluation program (PC based or Embedded Software based). An $S_{k,r}$-quality report is generated and transfer correction data is calculated for color and geometrical aberrations. The $S_{k,r}$-quality information can be used for fine-tuning of each device component when produced. When an apparatus is bought the consumer gets a certified quality document for every device component building up the system. Inside a device component there is an EPROM which holds the correction information. This EPROM(s) may be reloaded periodically with new settings by a certified distributor of the component. When new image information passes a particular component geometrical and/or color correction can be carried out.

Apparatus

In another embodiment, an apparatus capable of performing an $S_{k,r}$-matrix method is used.

Preferably, the apparatus comprises means for generating an image of an $S_{k,r}$-object; means for defining an actual $S_{k,r}$-matrix for said generated $S_{k,r}$-image; means for generating a reference $S_{k,r}$-image; means for defining a reference $S_{k,r}$-matrix for said reference $S_{k,r}$-image; means for calculating the intermediate quasi-$S_{k,r}$-matrix from the actual $S_{k,r}$-matrix, means for identifying a reference $S_{k,r}$-matrix, which shows the best fit with the intermediate quasi-$S_{kr}$-matrix; means for calculating/determining the image $S_{kr}$-quality parameters of the generated $S_{kr}$-image; means for correcting image quality parameters of a generated image as to fit desired (standard) image quality parameters; means for restoring and visualizing a corrected $S_{kr}$-image and means for visualizing a corrected $S_{kr}$-image.

In another embodiment, the apparatus further comprises means for selecting a region of interest (ROI) on a generated $S_{kr}$-image; means for defining an actual $S_{kr}$-sub-matrix for said ROI on said generated $S_{kr}$-image; means for selecting a ROI on a reference $S_{kr}$-image; means for calculating the associated quasi-Skr-sub-matrices from the actual $S_{kr}$-sub-matrices, means for defining reference $S_{kr}$-sub-matrices for said ROI on said reference $S_{kr}$-image.

Preferably, the means for generating an $S_{kr}$-image may comprise but are not limited to optical devices such as sensors, cameras, scanners, spectrophotometers, infrared cameras, copying machines, printers, etc. . . .

Preferably, the means for defining the actual matrix for a generated $S_{kr}$-image or the actual sub-matrix for a ROI on said generated $S_{kr}$-image comprise software routines capable of establishing the matrices.

Preferably, the means for defining the intermediate and quasi-$S_{kr}$-matrix for a derived actual matrix or an intermediate and quasi-$S_{kr}$-sub-matrix for a ROI on said actual sub-matrices comprise software routines capable of establishing the matrices.

Preferably, the means for defining a reference $S_{kr}$-matrix for a reference image or for defining a reference $S_{kr}$-sub-matrix for said ROI on said reference $S_{kr}$-image comprise software routines capable of establishing and operating with $S_{kr}$-matrices.

Preferably, the means for identifying a best fit Skr-matrix for a derived quasi-$S_{kr}$-matrix, or a best fit $S_{kr}$-sub-matrix for derived quasi-$S_{kr}$-sub-matrices comprises software routines capable of establishing and performing best-fit $S_{kr}$-calculations.

Preferably, the means for calculating and determining image $S_{kr}$-quality parameters of the generated $S_{kr}$-image comprises software programs capable of evaluating the image $S_{kr}$-quality. The software runs the algorithms which guide the specific $S_{kr}$-quality evaluation of $S_{kr}$-image material, e.g. pictures, scans, etc. . . . , through the numerical work that may be delivered. In time critical circumstances a part of this work can be done by the use of Field Programmable Gate Arrays (FPGA's) build into an apparatus or into different types or components of such apparatus.

Preferably, the closed loop feedback for improving the image $S_{kr}$-quality parameters of generated $S_{kr}$-images as to fit desired (standard) image quality parameters comprise software programs which run self-tuning algorithms.

Preferably, the means for restoring a corrected image may comprise software programs capable of restoring images for geometrical distortion effects and/or color corrections.

Preferably, the means for visualizing a corrected $S_{kr}$-image may comprise but are not limited to monitors, printers, scanners, TV screens, HDTV screens, GPS screens etc. . . .

Preferably, the means for selecting a region of interest (ROI) on a generated $S_{kr}$-image and means for selecting a ROI on a reference $S_{kr}$-image comprise software which deals with specific region and/or grid pattern selections. The specific regions are e.g. the Kronecker sub-matrices, Nord-South-East-West sub-triangles, corner triangles, square-rectangle-rombic sub-regions, banded diagonal regions . . . .

Preferably, the present apparatus may be further provided with means for establishing an $S_{kr}$-quality report of a generated $S_{kr}$-image and/or a restored $S_{kr}$-image.

The present apparatus may also further comprise means for adapting the apparatus to use embedded technology.

In another embodiment, an apparatus capable of performing an $S_{kr}$-matrix method is used.

Preferably, the apparatus comprises a device configured to generate an image of an $S_{kr}$-object; a module configured to define an actual $S_{kr}$-matrix for said generated $S_{kr}$-image; a module configured to generate a reference $S_{kr}$-image; a module configured to define a reference $S_{kr}$-matrix for said reference $S_{kr}$-image; a module configured to calculate the intermediate quasi-$S_{kr}$-matrix from the actual $S_{kr}$-matrix, a module configured to identify a reference $S_{kr}$-matrix, which shows the best fit with the intermediate quasi-$S_{kr}$-matrix; a module configured to calculate or define the image $S_{kr}$-quality parameters of the generated $S_{kr}$-image; a module configured to correct image quality parameters of a generated image as to fit desired (standard) image quality parameters; a module configured to restore and visualize a corrected $S_{kr}$-image and a module configured to visualize a corrected $S_{kr}$-image.

In another embodiment, the apparatus further comprises a module configured to select a region of interest (ROI) on a generated $S_{kr}$-image; a module configured to define an actual $S_{kr}$-sub-matrix for said ROI on said generated $S_{kr}$-image; a module configured to select a ROI on a reference $S_{kr}$-image; a module configured to calculate the associated quasi-Skr-sub-matrices from the actual $S_{kr}$-sub-matrices, a module configured to define reference $S_{kr}$-sub-matrices for said ROI on said reference $S_{kr}$-image.

Preferably, the module configured to generate an $S_{kr}$-image may comprise but are not limited to optical devices such as sensors, cameras, scanners, spectrophotometers, infrared cameras, copying machines, printers, etc. . . . .

Preferably, the module configured to define the actual matrix for a generated $S_{kr}$-image or the actual sub-matrix for a ROI on said generated $S_{kr}$-image comprise software routines capable of establishing the matrices.

Preferably, the module configured to define the intermediate and quasi-$S_{kr}$-matrix for a derived actual matrix or an intermediate and quasi-$S_{kr}$-sub-matrix for a ROI on said actual sub-matrices comprise software routines capable of establishing the matrices.

Preferably, the module configured to define a reference $S_{kr}$-matrix for a reference image or for defining a reference $S_{kr}$-sub-matrix for said ROI on said reference $S_{kr}$-image comprise software routines capable of establishing and operating with $S_{kr}$-matrices.

Preferably, the module configured to identify a best fit $S_{kr}$-matrix for a derived quasi-Skr-matrix, or a best fit $S_{kr}$-sub-matrix for derived quasi-$S_{kr}$-sub-matrices comprises software routines capable of establishing and performing best-fit $S_{kr}$-calculations.

Preferably, the module configured to calculate or determine image $S_{kr}$-quality parameters of the generated $S_{kr}$-image comprises software programs capable of evaluating the image $S_{kr}$-quality. The software runs the algorithms which guide the specific $S_{kr}$-quality evaluation of $S_{kr}$-image material, e.g. pictures, scans, etc. . . . , through the numerical work that may be delivered. In time critical circumstances a part of this work can be done by the use of Field Programmable Gate Arrays (FPGA's) build into an apparatus or into different types or components of such apparatus.

Preferably, the closed loop feedback for improving the image $S_{kr}$-quality parameters of generated $S_{kr}$-images as to fit desired (standard) image quality parameters comprise software programs which run self-tuning algorithms.

Preferably, the module configured to restore a corrected image may comprise software programs capable of restoring images for geometrical distortion effects and/or color corrections.

Preferably, the module configured to visualize a corrected $S_{k,r}$-image may comprise but are not limited to monitors, printers, scanners, TV screens, HDTV screens, GPS screens etc. . . . .

Preferably, the module configured to select a region of interest (ROI) on a generated $S_{k,r}$-image and module configured to select a ROI on a reference $S_{k,r}$-image comprise software which deals with specific region and/or grid pattern selections. The specific regions are e.g. the Kronecker submatrices, Nord-South-East-West sub-triangles, corner triangles, square-rectangle-rombic sub-regions, banded diagonal regions . . . .

Preferably, the present apparatus may be further provided with a module configured to establish an $S_{k,r}$-quality report of a generated $S_{k,r}$-image and/or a restored $S_{k,r}$-image.

The present apparatus may also further comprise a module configured to adapt the apparatus to use embedded technology.

Suitable hardware includes hardware for high quality photographic $S_{k,r}$-images production, hardware for making high quality thermal photo (continuous mosaic), hardware for making high quality X-, gamma or laser-ray absorbing material, hardware for making high quality transparent lenses with an $S_{k,r}$-motive. Suitable software programs include routines for generating typical $S_{k,r}$-reference information, routines for evaluating the different image $S_{k,r}$-quality aspects, routines for image correction purposes, routines to generate the image $S_{k,r}$-quality reports and the feedback information for automated or guided $S_{k,r}$-quality improvement activities, routines necessary for the conversion of software into an hardware approach by using FPGA or other embedded technology, software on FPGA, DVD or PC for high quality $S_{k,r}$-sequence production. The hard- and software form the material and algorithmic representation of the $S_{k,r}$-matrix theory and lead to equations which can be worked out to evaluate one of the numerous aspects of the $S_{k,r}$-image quality control. It also concerns the generation of $S_{k,r}$-image quality reports and everything which is necessary to become a wide spread interactive tool for image calibration and color management technology over the Internet.

In an embodiment, the apparatus comprises a box with optimized illumination conditions, e.g. coaxial light, frequency specific light, polarized light . . . , in which $S_{k,r}$-scenes are presented to cameras. In another embodiment the apparatus comprises transparent material on a lens which has a transparency structure e.g. for visual light or other rays such as X- and gamma rays, conform to the $S_{k,r}$-matrices structure. In another embodiment, the apparatus comprises a plate of a heat-conductive material which is brought to a constant temperature at its boundaries and which therefore has a heat equilibrium that follows the Helmholtz-equition and therefore reflects $S_2$-matrix structure properties.

EXAMPLES

Example 1

For Photocopiers, Scanners, Industrial Vision Applications

Hereafter some application examples of the present method is provided. There is started with an as pure as possible made reference image (e.g. on High Quality Photographic Paper). Such images are stable and color reliable. For instance in the case of reference $S_{k,r}$-images in the form of "high Quality Photos" it will be understood dat these photos will never be 100% optimal and moreover that these photos relatively quickly will undergo an aging process: e.g. the light source of the photocopier interacts with the pigments used in the photo. The term "as pure as possible" is therefore to be understood in terms of calibration, and refers to a reference image that most closely fits the real image.

The gamut overlaps almost the complete CIExy color spectrum (=chromaticity diagram) with a uniform spread of the color tones. If needed the feed forward principals mentioned (see above) can be used to build in an application-related gamma factor or other non-linear effects. The intention is that the perception goes the opposite way and for this reason the perception ends with an image which again has the $S_{k,r}$-matrix or quasi $S_{k,r}$-matrix structure. We start the observations with illumination intensity I=0 (Lux). The values obtained during $S_{k,r}$-image recording, also need to be zero: $\sigma_{ij}$=0. Aberrations can originate from thermal noise or due by threshold voltages in the apparatus' electronics. In every particular set-up, having a reference $S_{k,r}$-image with fixed settings, for every theoretical grey value or color component $s_{ij}$ and a known local reflection coefficient, a theoretical intensity $I_0(s_{ij})$ exists whereas the observation $\sigma_{ij}$ corresponds to the level desired on a specific place on the image. If we increase the illumination gradually (for example in 10 steps) all the pixel values of logarithmic sensitive set-ups will increase according to the following power function:

$$\sigma_{ij}(I)/s_{ij}(I_0)=(I/I_0)^p, \text{ or}$$

$$\log(\sigma_{ij}(I)/s_{ij}(I_0))=p*\log(I/I_0)$$

This function can be calibrated in laboratory conditions by means of linear regression and $S_{k,r}$-guidelines. When the relative illumination intensity (I/I$_0$) and the exponent p are known, the observed intensities $\sigma_{ij}$ can be converted to equivalent values which would appear in ideal illumination conditions:

$$s_{ij}(I_0)=\sigma_{ij}(I)*(I_0/I)^p.$$

Now the image restoration of images recorded in similar conditions is made possible (e.g.: with copying machines, industrial vision applications). The best-fit $S_{k,r}$-images show a deviation from the theoretical chromaticity diagram and have a real gamut. This deviation can be expressed as a set of vectors, which connect "the real color of a pixel" with the theoretical color in the color composition. Subsequently, this vector space can be used in the opposite direction to correct the observed colors back in the direction of the theoretical values. On this base colors and grey scale values become application independent and therefore this $S_{kr}$-system, like other color management systems do, is capable to calculate the color conversions needed to make 'color communication' possible between different applications. In practice such vector spaces often are converted into lookup tables.

Example 2

Special Filter Techniques and Special $S_{kr}$-Forms

Well-considered filtering (e.g. convolutions) of the recorded reference $S_{kr}$-images (especially the Helmholtz-alike S-matrices) theoretically leads to 'quasi sparse matrices' theoretical going from full zero-matrices and 'banded matrices', to matrices having a Toeplitz or an Hankel structure. It is noted that the terms "sparse matrices" and "banded matrices" are well known in the art and will not be further explained herein. The term "quasi sparse matrix" refers to a matrix strongly approximating the said sparse matrix.

For example: during the common used low-pass 'Laplacian' and high-pass 'anti-Laplacian' filtering, with respective kernels $[-1; -1\ 4-1; -1]$ and $[-1; 1\ 0\ 1; -1]$, a special diagonal matrix has to be found for a feed forwarded Down(m) matrix because the image is formed row-by-row and column-by-column as a surface with a straight-line generatrix. The zone-depended correction functions, the local noise and the effects of over- and under-illumination can be measured and explained from such filtered images. The inverted Down(m) matrix is theoretically equal to the tridiagonal $S_1$-matrix:

$$\text{Down}(m)^{-1} = [2 - 1 0 0 0 0 0 0 \ldots 0 0 0 0 0 0 0]/(m+1).$$

Therefore the product of well considered pixel selections from a reference $S_{kr}$-image and $\text{Down}(m)^{-1}$ should be equal to a unity matrix of order m. This calculation gives specific information about the local image coherence. The deviations are normative for the quality loss and give the opportunity to guide the above-mentioned corrections.

The averages of the independently calculated basic components $C_r$ of an $S_{kr}$-matrix can be determined from the intermediate quasi-$S_{kr}$-matrix dots $s_{ij}$. The spread on the basic components are characteristic for the deviation from the ideal sum structure. Again the correction factors and noise matrix can be determined. The systematic error and the noise is found as the residue with respect to the $S_{kr}$-matrix' Toeplitz-Hankel-decomposition. The least mean square algorithms to find the best fit $S_{kr}$-matrices point out to be very easy compared with the well known linear, parabolic or higher order regression techniques. Meanwhile the calculation has intrinsic much more degrees of freedom. As an example we show the sets of algebraic equations which arise during the best-fit $S_{kr}$-calculation. As best fit parameters one can take cognition numbers and basic components. To illustrate the calculations we calculate the parameters for a quasi-$S_1$(15)-matrix. In practice a lot of sub-areas can be chosen but to keep the presentation easy we chose here for the information in the northern sub-triangle of a representative set of pixels during image evaluation (Table I):

TABLE I

| s11 | s12 | s13 | s14 | s15 | s16 | s17 | s18 | s19 | S1, 10 | s1, 11 | s1, 12 | s1, 13 |
|-----|-----|-----|-----|-----|-----|-----|-----|-----|--------|--------|--------|--------|
| c0-c2 | c1-c3 | c2-c4 | c3-c5 | c4-c6 | c5-c7 | c6-c8 | c7-c9 | c8-c10 | c9-c11 | c10-c12 | c11 | c12 |
|  | s22 | s23 | s24 | s25 | s26 | s27 | s28 | s29 | s2, 10 | s2, 11 | s2, 12 |  |
|  | c0-c4 | c1-c5 | c2-c6 | c3-c7 | c4-c8 | c5-c9 | c6-c10 | c7-c11 | c8-c12 | c9 | c10 |  |
|  |  | s33 | s34 | s35 | s36 | s37 | s38 | s39 | s3, 10 | s3, 11 |  |  |
|  |  | c0-c6 | c1-c7 | c2-c8 | c3-c9 | c4-c10 | c5-c11 | c6-c12 | c7 | c8 |  |  |
|  |  |  | s44 | s45 | s46 | s47 | s48 | s49 | s4, 10 |  |  |  |
|  |  |  | c0-c8 | c1-c9 | c2-c10 | c3-c11 | c4-c12 | c5 | c6 |  |  |  |
|  |  |  |  | s55 | s56 | s57 | s58 | s59 |  |  |  |  |
|  |  |  |  | c0-c10 | c1-c11 | c2-c12 | c3 | c4 |  |  |  |  |
|  |  |  |  |  | s66 | s67 | s68 |  |  |  |  |  |
|  |  |  |  |  | c0-c12 | c1 | c2 |  |  |  |  |  |
|  |  |  |  |  |  | s77 |  |  |  |  |  |  |
|  |  |  |  |  |  | c0 |  |  |  |  |  |  |

The best fit least-mean-square calculations can be properly derived from the vector space properties of $S_{kr}$-matrices. The following examples show the structure of the sets of equations that will be found for the different approximations.

a. The calculation of the cognition numbers $s_k$, k=1:m. Remark: the matrices $A_1$ and $A_2$ which are found on their turn are $S_1$-matrices (here: $^{16}$Down(7) and $^{12}$Down(6)

TABLE II

| Matrices $A_1$ and $A_2$ | | | | | | | $S_{2k+1}$ | The right side (R) of the equations |
|---|---|---|---|---|---|---|---|---|
| 7 | 6 | 5 | 4 | 3 | 2 | 1 | * s1 | = s11 + s22 + s33 + s44 + s55 + ... + s77 |
| 6 | 12 | 10 | 8 | 6 | 4 | 2 | s3 | s13 + s24 + ... + s22 + s33 + s44 + |
| 5 | 10 | 15 | 12 | 9 | 6 | 3 | s5 | R5 |
| 4 | 8 | 12 | 16 | 12 | 8 | 4 | s7 | R7 |
| 3 | 6 | 9 | 12 | 15 | 10 | 5 | s9 | R9 |
| 2 | 4 | 6 | 8 | 10 | 12 | 6 | s11 | R11 |
| 1 | 2 | 3 | 4 | 5 | 6 | 7 | s13 | R13 |
| 6 | 5 | 4 | 3 | 2 | 1 |  | * s2 | = s12 + s23 + s34 + s45 + s56 + s67 |
| 5 | 10 | 8 | 6 | 4 | 2 |  | s4 | R4 |
| 4 | 8 | 12 | 9 | 6 | 3 |  | s6 | R6 |
| 3 | 6 | 9 | 12 | 8 | 4 |  | s8 | R8 |
| 2 | 4 | 6 | 8 | 10 | 5 |  | s10 | R10 |
| 1 | 2 | 3 | 4 | 5 | 6 |  | s12 | R12 | b. The calculation of the basic components $C_r$, r=0:m+1 (Table III). Remark: the matrices $A_1$ and $A_2$ which are found are easy to invert.

TABLE III

| Matrices $A_1$ and $A_2$ | | | | | | | | C | 'Toeplitz part' | | 'Hankel part' |
|---|---|---|---|---|---|---|---|---|---|---|---|
| 7 | −1 | −1 | −1 | −1 | −1 | −1 | * | C0 | = s11 + s22 + s33 + s44 + s55 + ... + s77 | + | −s11 |
| −1 | 7 | −1 | −1 | −1 | −1 | −1 | | C2 | s13 + s24 + s35 + s46 + s57 + s68 | | −s22 − s13 |
| −1 | −1 | 7 | −1 | −1 | −1 | −1 | | C4 | s15 + s26 + s37 + s49 + s59 | | −s33 − s24 − s15 |
| −1 | −1 | −1 | 7 | −1 | −1 | −1 | | C6 | s17 + s28 + s39 + s4, 10 | | −s44 − s35 − s26 − s17 |
| −1 | −1 | −1 | −1 | 7 | −1 | −1 | | C8 | s19 + s2, 10 + s3, 11 | | −s55 − s46 − s37 − s28 − s19 |
| −1 | −1 | −1 | −1 | −1 | 7 | −1 | | C10 | s1, 11 + s2, 12 | | −s66 − s57 ... − s39 − s2, 10 − s1, 11 |
| −1 | −1 | −1 | −1 | −1 | −1 | 7 | | C12 | s1, 13 | | |
| 6 | −1 | −1 | −1 | −1 | −1 | | * | C1 | = s12 + s23 + s34 + s45 + s56 + s67 | + | −s12 |
| −1 | 6 | −1 | −1 | −1 | −1 | | | C3 | s14 + s25 + s36 + s47 + s58 | | −s23 − s14 |
| −1 | −1 | 6 | −1 | −1 | −1 | | | C5 | s16 + s27 + s38 + s49 | | −s34 − s25 − s16 |
| −1 | −1 | −1 | 6 | −1 | −1 | | | C7 | s18 + s29 + s3, 10 | | −s45 − s36 − s27 − s18 |
| −1 | −1 | −1 | −1 | 6 | −1 | | | C9 | s1, 10 + s2, 11 | | −s56 − s47 − s38 − s29 − s1, 10 |
| −1 | −1 | −1 | −1 | −1 | 6 | | | C11 | s1, 12 | | |

Depending on the region chosen, the right hand side of each separate equation is given by the quasi-$S_{kr}$-matrix elements which are linked with the conjugated cognition number $s_j$ or with the corresponding basic component $C_r$. The natural separation in odd and even parts reflects the intrinsic property of $S_{kr}$-matrices that odd and even components are independent from each other. The matrix inversions $A_1^{-1}$ and $A_2^{-2}$ don't need double precision calculations because the inverted forms are analytically well known and integer valued. Other regions could be used and give rise to very similar and easy calculation forms. We advice to express the image $S_{kr}$-quality by means of the calculation results found for the next regions:

the overall matrix or Kronecker sub-matrices.
the triangles in the North, South, East and West,
the upper right, upper left, lower right and lower left triangles,
the left, right, upper and lower half matrix,
the corner triangles or their area complement (the central square under 45°)
3, 5 or 7 rows width banded, diagonal and/or cross diagonal pixel elements etc. . . . .

Evaluations on higher order $S_{kr}$-matrices are based on the same principles. In this case the image $S_{kr}$-quality calculations can focus on the pixels themselves (the details) on the Kronecker sub-matrices (the sub regions) or on the total image (overall quality).

Example 3

About the Determination of the $S_{kr}$-quality 3.1. Gamma-Estimations

This example illustrates how to find the mean gamma-factor between an ideal matrix Down(m) and a reliable perception P of this matrix. Based e.g. on gamma tables or power routines there is searched for a good combination of a constant or systematic offset C and the gamma-factor, in such a way that the intermediate expression $(P-C)^{\hat{}}\gamma./Down(m)$ is rather constant and has the smallest possible standard deviation. At this moment the product $(P-C)^{\gamma}*Down^{-1}$ is close to a multiple of the unity matrix of order m. Therefore the $S_{kr}$-quality of such an image can be expressed in terms of the Error values in the equation:

$$(P-C)^{\hat{}}\gamma*Down^{-1}=k\cdot I+\text{Error values}$$

Remark: the Matlab operators '.^ and ./' denote element wise operations for matrices.

3.2. Symmetry Around the Diagonals

This example illustrates how to express the loss of symmetry in a diagonal-symmetric $S_{kr}$-test image. When the symmetry is perfect the difference of the image matrix and its transposed form D' (rows become columns and columns become rows) will be a zero matrix of order m. For this reason the matrix norm $\|D-D'\|$ gives a good impression about the diagonal-symmetry property. A normalized version of this quality measurement can be written as: $\|D./D' - \text{ones}(m)\|$=minimal. Again, the operator './' represents the element wise matrix division.

3.3. Symmetry Around the Meridians

This example illustrates how to express the loss of symmetry in a meridian-symmetric $S_{kr}$-test image. When the symmetry is perfect the difference of the image matrix and its mirrored form $D_{rev}$ (rows become a reverse ordering or columns become a reverse ordering) will be a zero matrix of order m. For this reason the matrix norm $\|D./D_{rev} - \text{ones}(m)\|$ gives a good impression about the meridian-symmetry property. Another variant can be: $\|(D+D_{rev})./\text{Equal}(m)-2*\text{ones}(m)\|$.

3.4. The Linear Aspect Within the Matrix Down

This example illustrates how to evaluate the linearity property in the row and column directions. Since Down is linear in row- and column direction, a regression analysis can be performed for each row and column of the intermediate quasi-$S_{kr}$-matrix separately. If the different correlation coefficients (for rows and columns directions) remains close to unity then their sum is close to (2*m). The standard deviation can be taken as a measure for the linear quality. Further, in the perfect conditions the sum of the absolute values of the intersections $b_i$ and $b_j$ should be zero. The regression coefficients $a_i$ and $a_j$ for the separated rows and columns of Down(m) follow the rules as given now:

$$a_i=S_{i,N-i}/(N-i); b_i=0; r_i=1; i=1:N2-1; N=m+1$$

$$a_i=255/N2; b_i=0; r_i=1; i=N2$$

$$a_i=s_{i,N-i}/(N-i); b_i=0; r_i=1; i=N2+1:m$$

$$a_j=s_{N-j,j}/(N-j); b_j=0; r_j=1; j=1:N2-1$$

$$a_j=255/N2; b_j=0; r_j=1; j=N2$$

$$a_j=s_{N-j,j}/(N-j); b_j=0; r_j=1; j=N2+1:m; N2:=(m+1)/2$$

3.5. The Image Eigenvalues

This example illustrates how to express the image $S_{kr}$-quality loss from the eigenvalues of the observed image. The eigenvalues can be determined from the odd rows and the odd columns of the intermediate quasi-$S_{kr}$-matrix. To avoid sine value calculations the recursion formula for "Chebyshev Polynomals" can be applied. The standard deviation of the independent eigenvalue calculations gives a good impression about the image $S_{kr}$-quality.

There is obtained:

$$e_{2i+1,p} = \Sigma_k S_{i,k} * U_{k-1}(x)/U_{i-1}(x))$$

with $x=2\cos(\pi p/N)$; $p=1:m$, $k=1:m$. (from odd rows);

$$e_{2j+1,p} = \Sigma_k S_{kj} * U_{k-1}(x)/U_{j-1}(x);$$

with $p=1:m$, $k=1:m$. (from odd columns);

3.6. V-Shaped Coherence

This example illustrates how to express the image $S_{kr}$-quality based on pixel values of the intermediate quasi-$S_{kr}$-matrix which are located on V-alike traces. Seen from the pixel $s_{ij}$ with $i \leq j \leq N-I$ one can be proven that: $(i-1)*s_{ij} = \Sigma_k (s_{i-kj-k} + s_{i-kj+k})$; $k=1:(i-1)$. For higher order $S_{kr}$-matrices corresponding expressions can be derived for the Kronecker sub-levels.

3.7. Hyperbole-Evaluation

This example illustrates how to express the image $S_{kr}$-quality based on hyperbolic trajectories in the continued or quasi-continued actual or intermediate quasi-$S_{kr}$-matrix of type 'Down'. Such test matrices are derived by making a limit transition in which $m \to \infty$, $N=m+1$. On every hyperbolic pad, with the matrix borders as asymptotes, the pixel values should have a constant intensity level given by the relations:

$$s_{ij} = 1024 * i * j / N^2, \text{ in the Nord-West sub-matrix;}$$

$$s_{ij} = 1024 * (N-i) * (N-j)/N^2, \text{ in the South-East sub-matrix.}$$

The mean value and the spread along this hyperbolic pixel positions give expression to the $S_{kr}$-quality in relation to the pixel intensity.

3.8. Toepiltz-Hankel Quality

This example illustrates how to express the image $S_{kr}$-quality based on the Toeplitz-Hankel decomposition of the intermediate quasi-$S_{kr}$-image. The matrix norm of the differences between the theoretical components and the real components is a measure for the image $S_{kr}$-quality. Expressed in normalized formulas this gives:

the Toeplitz quality $= TQ = \|T_{theory}/T_{real} - \text{ones}(m)\|$;

the Hankel quality $= HQ = \|H_{theory}/H_{real} - \text{ones}(m)\|$;

3.9. The Best Toeplitz-Hankel Fits

This example illustrates how to express the image $S_{kr}$-quality based on the best fit Toeplitz-Hankel decomposition of the intermediate quasi-$S_{k,r}$-image in relation to the decomposition of the reference $S_{kr}$-image. The matrix norm of the differences between the theoretical components and the real best-fit components is a measure for the intrinsic image information quality. Expressed in normalized formulas this gives:

a best fit Toeplitz quality $= BFTQ = \|T_{theory}/T_{best\,fit} - \text{ones}(m)\|$;

a best fit Hankel quality $= BFHQ = \|H_{theory}/H_{best\,fit} - \text{ones}(m)\|$.

The evaluation can be carried out with all the image pixels or special selections from them. We suggest to use pixels from the upper and lower triangular matrix, all pixels of the North, South, East and West sub-triangular matrix, the pixels in rhombic- or parallelogram-alike sub-regions, the pixels of the diagonal zones, the pixels from the corner regions, pixels from concentric square zones, pixels from meridian zones, etc. . . . Each of these evaluations gives detailed information on the $S_{kr}$-quality of the image. The evaluations can also be worked out on Kronecker sub-matrices and provide then zone-dependent information and correction possibilities.

4. Experimental Results

Based on practical experiments with different image carriers like high quality photos, printouts from several photocopiers, scanners, screens, some typical $S_{E1}$-quality control results will be explained hereafter. There was started with images taken form $S_{E1}$-objects by means of industrial camera's (i.e. INKA 311 camera from Philips, DVT 542C, Keyence CV 701, Pulnix CMOS and CCD, webcams . . . ) and a common digital camera. The results for a random chosen image are summarized in the table below. The image looks like a chessboard with 15×15 sub-squares having grey values conform to an $S_{E1}$-matrix. In fact this matrix is formed as the Kronecker product of $^{255}S_{E1}(15)$ with the Matlab matrix 'ones(50)'. The developed Matlab program 'Skr_quality.m' needs an $S_{2,1}$-reference image as an input and a threshold value to find the borders of the region of interest. In every cell the intensity of a random pixel is measured and collected in the quasi-$S_1$-matrix 'qs1R(15×5)'. A second selection stores the mean grey value of 5×5 neighboring pixels from each image cell in the matrix 'qs1'. Based on the four fold symmetry of $^{255}S_{E1}$ the matrix 'Mean' is calculated from 'qs1' by averaging the grey values found over the symmetrical positions. Then, based on classical logarithmic regression techniques from the grey values in the image to the theoretical values of $^{255}S_{E1}$, the Gain (K), the offset (C) and the gamma factor (G) of the matrices are derived. These values are used to determine the intermediate and more or less image independent representation of the $S_{E1}$-information in the image. The related matrices found are named 'Intermediate matrices'. Such matrices are close to an $S_1$-matrix and therefore it makes sense to calculate their best fit $S_1$-matrix structure. At the end of the calculations the $S_{E1}$-quality of the image can be expressed in terms of deviations (Root-Means-Square errors (RMS)) and the correlations of the matrices qs1R, qs1 and Mean, with respect to the integer valued matrix Round (255*SE1) or the theoretical matrix $^{255}S_{E1}$. In addition the double Discrete Sine Transform of the matrices is calculated. In fact the matrices are left and the right hand side multiplied with the eigenvectormatrix E of $^{255}S_{E1}$. For $S_{E1}$-matrices or quasi $S_{E1}$-matrices one value is superior to all the other components of this transform. Therefore a powerful parameter to express the $S_{E1}$-quality is given by the logarithm of the ratio between the biggest value found relative to the second value in rank: $Q := 20 * \text{Log}_{10}(|e_{max}/e_2|)$. This parameter may be expressed in decibel (dB). The higher the unique quality number Q, the better the quality of the image and the better the image forming technology behind it. The perfect image technology will make $Q = \infty$. The value Q may be interpreted as 'an image-information-to-noise-ratio' and is comparable with other known quality numbers: e.g. the signal-to-noise ratio (S/N-ratio) of an Hifi-installation.

TABLE IV

| Matrices | qs1R | qs1 | Mean | Round (255 * SE1) | $S_{E1}$ |
|---|---|---|---|---|---|
| K (Gain) | 0.0130 | 0.0178 | 0.0333 | 0.0041 | 1/255 = 0.0038 |
| G (Gamma) | 0.7989 | 0.7408 | 0.6215 | 0.9924 | 1.0 |
| C (Offset) | 12 | 17 | 24 | 0.5000 | 0.0 |

TABLE IV-continued

| Matrices | qs1R | qs1 | Mean | Round (255 * SE1) | $S_{E1}$ |
|---|---|---|---|---|---|
| RMS_Intermed | 0.0437 | 0.0363 | 0.0084 | 0.0013 | 0.0 |
| RMS_Best-$S_1$-Fit | 0.0153 | 0.0114 | 0.0037 | 0.00082 | 0.0 |
| Correlation (raw) | 0.9825 | 0.9841 | 0.98831 | 0.99999984 | 1.0 |
| Correlation Intermed. | 0.9889 | 0.9922 | 0.9995 | 0.9999999 | 1.0 |
| Correlation Best Fit | 0.99912 | 0.999575 | 0.999931 | 0.9999966 | 1.0 |
| DST: Biggest value $e_{max}$ | 7.2780 | 7.2860 | 8.0281 | 8.0030 | 8.0 |
| DST: Second value $e_2$ | 0.2355 | 0.2398 | −0.0373 | 0.0044 | 0.0 |
| Q = 20 * $Log_{10}(|e_{max}/e_2|)$ | 29.8 dB | 29.7 dB | 66 dB | 65.2 dB | Q = ∞ |

CONCLUSIONS

In conclusion, calibration techniques based on classic one-dimensional regression analyses, (such as e.g. the IT8-calibration technique for correcting color images with linear or non-linear methods), have less degrees of freedom to establish and represent a varied color pallet (gamut). The disclosed embodiments overcome the draw back of known calibration methods by providing an $S_{k,r}$-calibration method which uses two-dimensional image coherence interpretations, using a specific reference $S_{k,r}$-matrix system comprising test matrices and having an internal $S_{k,r}$ matrix structure. In particular, advantages of the discussed embodiments comprise at least that:

- an $S_{k,r}$-matrix can be split into two sub-structures ($S_{even}$ and $S_{odd}$), without loosing its intrinsic properties. The even (odd) elements of S can be derived form the even basic (odd) components $C|_{i-j}|$ and $C_{1+j}$. Reducing one group to zero will not influence the other. This has its consequences on the cognition numbers and on the $S_{k,r}$-matrix elements. Even at the level of the eigenvalues the effect of this split is remarkably limited. Such splits are useful in contrast evaluation procedures and 'cross pixel leakage' calculations for camera's, scanners and screens.
- $S_{k,r}$-matrices also can be split into a set of 2(k−r) symmetrical and mixed Toeplitz-Hankel forms. This leads to useful procedures for evaluating the diagonal coherence of an $S_{k,r}$-image. For some variants there is also symmetry around the meridians. The consequence of the k-fold structure of an $S_{k,r}$-matrix is that the symmetry aspects will exist in the Kronecker sub-matrices too. This property is very useful for symmetry evaluation on the level of ROI of images or for the $S_{k,r}$-image as a hole.
- A well considered combination of the matrices Up(m), UpDown(m) and Down(m) as color components (e.g. RGB) makes it possible to construct reference images with homogenously spread colors. This distribution can be improved by inverting pixel values relative to 255 in some symmetrical triangular regions. Using higher color resolution the reference images can be extended to an homogenous color continuum.
- The definition and the evaluation of $S_{k,r}$-images is compatible with the modern 'Embedded Technology' (like FPGA, microprocessors . . . ). The reason for this is that the algorithms are strongly linked to the internal sum structure of the S-matrices. This makes it possible to define, evaluate and correct images and image sequences in real time.
- The best fit algorithms for $S_{k,r}$-matrices are numerically very attractive. There are m degrees of freedom for $m^2$ data elements. Compared with linear or parabolic regression analysis this is a great benefit. The calculation only requires one mathematical operation for each pixel value. This is extremely important for real time image analysis. The present procedures have the additional advantage of permitting to run over some specific sub-regions such as triangles, rhombic areas, parallelograms, corners, banded diagonals, banded meridians, concentric squares, etc. . . .

In this application the matrices are used to solve different kinds of partial differential equations defined over rectangular regions. Such rectangular regions are very natural in image and vision technologies. The test $S_{k,r}$-matrix system in particular comprises test $S_{k,r}$-matrices having an internal $S_{k,r}$-matrix sum structure. The index k refers to the fractal level of a matrix, having matrices themselves as elements. The index r≦k refers to the Kronecker sub-level to which the typical internal sum structure is present. Due by this typical sum structure an $S_{k,r}$-matrix has a special link with Toeplitz and Hankel matrices and the eigenvectors of such $S_{k,r}$-matrices have a strong connection with the Chebyshev Polynomals and the Discrete Sine Transform. Based on there properties $S_{k,r}$-matrices can be created and explained in terms of cognition numbers, basic components and/or eigenvalues. A full continuation of the $S_{k,r}$-matrices is possible and can be associated to continuated grey scale values or a color continuum in images. $S_{k,r}$-matrices also form vector spaces in which matrix distances properly can be calculated. According to the present method the image $S_{k,r}$-quality can be determined and expressed from the so called intermediate quasi-$S_{k,r}$-matrix and its best-fit $S_{k,r}$-approximation in relation to a theoretical reference $S_{k,r}$-matrix. The evaluation can be worked out on a fractal basis. This means that overall as well as local image quality parameters are calculated. The presented embodiments also provide self-tuning algorithms as a method for calibrating an optical device. The discussed embodiments further provides for the use of a test $S_{k,r}$-matrix system for evaluating the quality of an $S_{k,r}$-image or a sequence of $S_{k,r}$-images and for calibrating optical devices. The applications are in the field of analogue and digital cameras, scanners, vision sensors, monitors, printers, spectrophotometers, infrared cameras, copying machines, TV-screens, GPS screens, X-rays, Gamma rays, Laser rays, or every other component in the image handling field.

What is claimed is:

1. A method of evaluating image quality of an image with a processor, the method comprising:
   a) generating an Sk,r-image of an object using an optical device;
   b) defining an actual Sk,r-matrix for said generated Sk,r-image, said actual Sk,r-matrix comprising a value for each pixel of the generated Sk,r-image;
   c) providing a test matrix system comprising a plurality of reference Sk,r-matrices which define a plurality of corresponding reference Sk,r-images, wherein each reference Sk,r-matrix comprises a value for each pixel of the corresponding reference Sk,r-image, and wherein the reference Sk,r-matrices have an internal Sk,r-matrix structure, wherein k and r are different from zero;

d) selecting one of the reference Sk,r-matrices as a best-fit matrix, the best-fit matrix having a best-fit with the actual Sk,r-matrix; and e) determining image Sk,r-quality parameters of the generated Sk,r-image based on the best-fit matrix, wherein the method is performed in conjunction with a processor, and wherein the actual Sk,r-matrix and the reference Sk,r-matrices are formed such that for each matrix, every order with respect to r and with respect to the matrix dimensions spans a unique space.

2. The method according to claim 1, further comprising selecting a region of interest (ROI) on the generated Sk,r-image for evaluating the image quality of said generated Sk,r-image.

3. The method according to claim 1, wherein the method further comprises:
   correcting the image Sk,r-quality parameters of the generated Sk,r-image such that the generated Sk,r-image more closely fits standard image Sk,r-quality parameters; and
   visually displaying the generated Sk,r-image after image correction.

4. The method according to claim 1, wherein the image Sk,r-quality parameters are corrected by correcting operational parameters of the optical device with a software program based on self-tuning algorithms.

5. The method according to claim 1, wherein said image comprises a sequence of images.

6. The method according to claim 1, wherein said test matrix system comprises reference Sk,r-matrices each having only one eigenvalue which differs from zero.

7. The method according to claim 1, wherein the test matrix system comprises reference Sk,r-matrices which are the Kronecker product of two or more Sk,r-matrices having an internal $S_{k,r}$ sum structure.

8. The method according to claim 1, further comprising determining image Sk,r-quality parameters of the generated Sk,r-image on a two dimensional basis.

9. The method according to claim 1, further comprising evaluating optical quality of the optical device.

10. The method according to claim 1, further comprising calibrating the optical device.

11. The method according to claim 1, wherein the actual Sk,r-matrix and the reference Sk,r-matrices comprise elements which are matrices.

12. The method according to claim 1, wherein the image Sk,r-quality parameters of the generated Sk,r-image comprise at least one of gamma factor, sharpness, resolution, brightness, contrast, intensity, gamut, symmetry, color coherence, and radial distortion.

13. A non-transitory computer readable medium comprising instructions, which when executed, cause the computer to perform a method of evaluating image quality of an image with a processor, the method comprising:

a) generating an Sk,r-image of an object using an optical device;

b) defining an actual Sk,r-matrix for said generated Sk,r-image, said actual Sk,r-matrix comprising a value for each pixel of the generated Sk,r-image;

c) providing a test matrix system comprising a plurality of reference Sk,r-matrices which define a plurality of corresponding reference Sk,r-images, wherein each reference Sk,r-matrix comprises a value for each pixel of the corresponding reference Sk,r-image, and wherein the reference Sk,r-matrices have an internal Sk,r-matrix structure, wherein k and r are different from zero;

d) selecting one of the reference Sk,r-matrices as a best-fit matrix, the best-fit matrix having a best-fit with the actual Sk,r-matrix;

e) determining image Sk,r-quality parameters of the generated Sk,r-image based on the best-fit matrix; and f) generating a report of the image Sk,r-quality parameters of the generated Sk,r-image, wherein the actual Sk,r-matrix and the reference Sk,r-matrices are formed such that for each matrix, every order with respect to r and with respect to the matrix dimensions spans a unique space.

14. A method of evaluating image quality of an image with a processor, the method comprising:

defining an actual Sk,r-matrix for a generated Sk,r-image, said actual Sk,r-matrix comprising a value for each pixel of the generated Sk,r-image;

providing a test matrix system comprising a plurality of reference Sk,r-matrices which define a plurality of corresponding reference Sk,r-images, wherein each reference Sk,r-matrix comprises a value for each pixel of the corresponding reference Sk,r-image, and wherein the reference Sk,r-matrices have an internal Sk,r-matrix structure, wherein k and r are different from zero;

selecting one of the reference Sk,r-matrices as a best-fit matrix, the best-fit matrix having a best-fit with the actual Sk,r-matrix;

determining image Sk,r-quality parameters of the generated Sk,r-image based on the best-fit matrix; and generating a report of the image Sk,r-quality parameters of the generated Sk,r-image, wherein the method is performed in conjunction with a processor, and wherein the actual Sk,r-matrix and the reference Sk,r-matrices are formed such that for each matrix, every order with respect to r and with respect to the matrix dimensions spans a unique space.

* * * * *